(12) United States Patent
Arai et al.

(10) Patent No.: US 8,269,915 B2
(45) Date of Patent: Sep. 18, 2012

(54) LIQUID CRYSTAL DISPLAY APPARATUS

(75) Inventors: Norihiro Arai, Hino (JP); Kunpei Kobayashi, Tachikawa (JP); Minoru Yamaguchi, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 367 days.

(21) Appl. No.: 12/616,937

(22) Filed: Nov. 12, 2009

(65) Prior Publication Data

US 2010/0123856 A1    May 20, 2010

(30) Foreign Application Priority Data

Nov. 18, 2008   (JP) ................................. 2008-294715

(51) Int. Cl.
*G02F 1/1335*   (2006.01)
(52) U.S. Cl. ........................................ 349/62
(58) Field of Classification Search ...... 349/62
See application file for complete search history.

(56) References Cited

U.S. PATENT DOCUMENTS

| | | |
|---|---|---|
| 5,694,186 A | 12/1997 | Yanagawa et al. |
| 6,124,971 A | 9/2000 | Ouderkirk et al. |
| 6,630,968 B1 | 10/2003 | Tsuchihashi et al. |
| 6,909,479 B2 | 6/2005 | Iijima |
| 6,975,455 B1 | 12/2005 | Kotchick et al. |
| 7,106,395 B2 | 9/2006 | Maeda |
| 7,349,039 B2 | 3/2008 | Lee et al. |
| 7,440,056 B2 | 10/2008 | Kobayashi |
| 7,567,317 B2 | 7/2009 | Tanaka et al. |
| 7,599,021 B2 * | 10/2009 | Tsuda et al. ............ 349/96 |
| 7,959,321 B2 | 6/2011 | Ryu et al. |
| 8,132,952 B2 | 3/2012 | Ryu et al. |
| 2002/0176036 A1 | 11/2002 | Kaneko |
| 2003/0058390 A1 | 3/2003 | Fujii |
| 2003/0081151 A1 | 5/2003 | Tsuchihashi et al. |
| 2003/0107692 A1 | 6/2003 | Sekiguchi |

(Continued)

FOREIGN PATENT DOCUMENTS

CN    1293768 A    5/2001

(Continued)

OTHER PUBLICATIONS

U.S. Appl. No. 12/148,794, filed Apr. 22, 2008. Reflection/Transmission Type Liquid Crystal Display Apparatus to Norihiro Arai, et al.

(Continued)

*Primary Examiner* — Eric Wong
(74) *Attorney, Agent, or Firm* — Holtz, Holtz, Goodman & Chick, PC

(57) ABSTRACT

A liquid crystal display apparatus includes a liquid crystal display device, a surface light source to irradiate illumination light toward the display device, and an optical member to reflect linearly polarized light having a light-vibration plane parallel to its reflection axis and to transmit linearly polarized light having a light-vibration plane parallel to its transmission axis. The display device includes a pair of substrates facing each other through a gap, a liquid crystal layer sealed into the gap between the substrates, and a pair of polarizing plates sandwiching the substrates therebetween. The substrates include electrodes formed on one of their facing surfaces. The optical member is arranged between the display device and the light source so that the reflection axis faces a direction crossing an absorption axis of the polarizing plate arranged between the display device and the light source at an angle falling within the 15° to 90° range.

15 Claims, 10 Drawing Sheets

U.S. PATENT DOCUMENTS

| | | | |
|---|---|---|---|
| 2003/0124381 A1 | 7/2003 | Thompson et al. | |
| 2005/0237749 A1 | 10/2005 | Epstein et al. | |
| 2006/0098456 A1 | 5/2006 | Sakamoto et al. | |
| 2006/0152931 A1 | 7/2006 | Holman | |
| 2006/0274248 A1 | 12/2006 | Kim et al. | |
| 2006/0289880 A1 | 12/2006 | Kurihara | |
| 2006/0290844 A1 | 12/2006 | Epstein et al. | |
| 2007/0121030 A1 | 5/2007 | Sato | |
| 2007/0147066 A1 | 6/2007 | Boyd et al. | |
| 2008/0164806 A1 | 7/2008 | Chen | |
| 2009/0027602 A1 | 1/2009 | Kobayashi | |
| 2009/0073353 A1 | 3/2009 | Yu et al. | |
| 2009/0103008 A1 | 4/2009 | Nasu et al. | |
| 2009/0167981 A1 | 7/2009 | Arai et al. | |
| 2010/0103350 A1 | 4/2010 | Arai et al. | |
| 2010/0188605 A1* | 7/2010 | Hasegawa et al. | 349/62 |
| 2010/0188608 A1* | 7/2010 | Hoshi et al. | 349/62 |
| 2010/0245718 A1 | 9/2010 | Nishino et al. | |
| 2010/0296036 A1 | 11/2010 | Fujii | |

FOREIGN PATENT DOCUMENTS

| | | | |
|---|---|---|---|
| CN | 1454329 A | 11/2003 | |
| CN | 1249500 C | 4/2006 | |
| CN | 1873496 A | 12/2006 | |
| JP | 5-061046 A | 3/1993 | |
| JP | 7-1427 A | 1/1995 | |
| JP | 9-15597 A | 1/1997 | |
| JP | 9-506985 A | 7/1997 | |
| JP | 11-509331 A | 8/1999 | |
| JP | 2000-66193 A | 3/2000 | |
| JP | 2000-122046 A | 4/2000 | |
| JP | 2001-235606 A | 8/2001 | |
| JP | 2001-235623 A | 8/2001 | |
| JP | 2001-281424 A | 10/2001 | |
| JP | 2001-350008 A | 12/2001 | |
| JP | 2002-107725 A | 4/2002 | |
| JP | 2003-15133 A | 1/2003 | |
| JP | 2003-98325 A | 4/2003 | |
| JP | 2003-172927 A | 6/2003 | |
| JP | 2003-172931 A | 6/2003 | |
| JP | 2003-255317 A | 9/2003 | |
| JP | 2003-279988 A | 10/2003 | |
| JP | 2004-54034 A | 2/2004 | |
| JP | 2004-93715 A | 3/2004 | |
| JP | 2004-511811 A | 4/2004 | |
| JP | 2004-287323 A | 10/2004 | |
| JP | 2005-107278 A | 4/2005 | |
| JP | 2006-138975 A | 6/2006 | |
| JP | 2007-140453 A | 6/2007 | |
| JP | 2007-534027 A | 11/2007 | |
| JP | 2008-122834 A | 5/2008 | |
| JP | 2009-157276 A | 7/2009 | |
| KR | 7-1427 A | 1/1995 | |
| KR | 10-0250720 B1 | 4/2000 | |
| KR | 2004-0010272 A | 1/2004 | |
| KR | 2004-0078925 A | 9/2004 | |
| KR | 10-2006-0055341 A | 5/2006 | |
| WO | 2006/104319 A1 | 10/2006 | |

OTHER PUBLICATIONS

U.S. Appl. No. 12/606,397, filed Oct. 27, 2009. Liquid Crystal Display Apparatus to Norihiro Arai, et al.

U.S. Appl. No. 12/940,919; First Named Inventor: Norihiro Arai; Title: "Liquid Crystal Display Device"; filed Nov. 5, 2010.

U.S. Appl. No. 13/019,251; First Named Inventor: Toshiharu Nishino; Title: "LCD Apparatus"; filed Feb. 1, 2011.

Korean Office Action dated Mar. 18, 2011 (and English translation thereof) in counterpart Korean Application No. 10-2009-0110956.

Japanese Office Action dated Jun. 14, 2011 and English translation thereof in Japanese Application No. 2008-277135, which is a Japanese counterpart of related U.S. Appl. No. 12/606,397.

Japanese Office Action dated Sep. 20, 2011 (and English translation thereof) in counterpart Japanese Application No. 2008-294715.

Japanese Office Action dated Nov. 30, 2010 (and English translation thereof) in counterpart Japanese Application No. 2008-294715.

U.S. Appl. No. 12/731,085, filed Mar. 24, 2010; First Named Inventor: Toshiharu Nishino; Title: "LCD Apparatus".

"Color LCD Technical Principle", revised edition (Nov. 30, 2011), Lien Tsun Chen, Jian-Hsin Publishing Inc.

Chinese Office Action dated May 14, 2012 (and English translation thereof) in counterpart Chinese Application No. 200910258406.9.

* cited by examiner

LIQUID CRYSTAL DISPLAY APPARATUS

CROSS-REFERENCE TO RELATED APPLICATIONS

This application is based upon and claims the benefit of priority under 35 USC 119 of Japanese Patent Application No. 2008-294715 filed on Nov. 18, 2008, the entire disclosure of which, including the description, claims, drawings, and abstract, is incorporated herein by reference in its entirety.

BACKGROUND OF THE INVENTION

1. Field of the Invention

The present invention relates to a liquid crystal display apparatus.

2. Description of the Related Art

As reflective/transmissive liquid crystal display apparatuses that carry out reflective display utilizing incident external light from an observation side and transmissive display utilizing illumination light from a surface light source arranged on an opposite side of the observation side, there are an apparatus disclosed in JP-A 2002-107725 (KOKAI) having a configuration that a surface light source is arranged on an opposite side of an observation side of a liquid crystal display device and a semi-transmissive reflection film is arranged on a rear side apart from a liquid crystal layer of the liquid crystal display device and an apparatus disclosed in JP-A 2004-93715 (KOKAI) having a configuration that a surface light source is arranged on an opposite side of an observation side of a liquid crystal display device, a plurality of pixels of the liquid crystal display device are sectioned into two regions, and a reflection film is provided on a rear side apart from a liquid crystal layer of one region to form a reflective display unit and a transmissive display unit in accordance with the plurality of pixels, for example.

BRIEF SUMMARY OF THE INVENTION

A liquid crystal display apparatus according to the present invention includes a liquid crystal display device, a surface light source to irradiate illumination light toward the liquid crystal display device, and an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis. The liquid crystal display device includes a pair of substrates that are arranged so as to face each other through a gap, a liquid crystal layer sealed into the gap between the substrates, and a pair of polarizing plates arranged so as to sandwich the pair of substrates therebetween. The pair of substrates include a plurality of electrodes formed on at least one of surfaces facing each other. The optical member is arranged between the liquid crystal display device and the surface light source in such a manner that the reflection axis of the optical member faces a direction that crosses an absorption axis of one of the pair of polarizing plates arranged between the liquid crystal display device and the surface light source at an angle falling within the range of 15° to 90°.

Another liquid crystal display apparatus according to the present invention includes a liquid crystal display device, a surface light source to irradiate illumination light toward the liquid crystal display device, an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis, and a reflective polarizing plate, arranged between the liquid crystal display device and the reflective polarizing film. The liquid crystal display device includes a pair of substrates that are arranged so as to face each other through a gap, a liquid crystal layer sealed into the gap between the substrates, and a pair of polarizing plates arranged so as to sandwich the pair of substrates therebetween. The pair of substrates include a plurality of electrodes formed on at least one of surfaces facing each other. The reflective polarizing film is arranged in such a manner that the reflection axis of the reflective polarizing film faces direction that crosses absorption axis of the one polarizing plate at an angle of 90° or below. The reflective polarizing plate has a transmission axis and a reflection axis perpendicular to each other, reflects linearly polarized light having a plane of vibration of light parallel to the reflection axis, transmits linearly polarized light having a plane of vibration of light parallel to the transmission axis, and is arranged in such a manner that the reflection axis of the reflective polarizing plate is parallel to the absorption axis of the one polarizing plate.

Still another liquid crystal display apparatus according to the present invention includes a liquid crystal display device, a surface light source to irradiate illumination light toward the liquid crystal display device, and an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis. The liquid crystal display device includes a pair of substrates that are arranged so as to face each other through a gap, a liquid crystal layer sealed into the gap between the substrates, and a pair of polarizing plates arranged so as to sandwich the pair of substrates therebetween. The pair of substrates include a plurality of electrodes formed on at least one of surfaces facing each other. The optical member is arranged between the liquid crystal display device and the surface light source in such a manner that the reflection axis of the optical member faces a direction that crosses an absorption axis of one of the pair of polarizing plates arranged between the liquid crystal display device and the surface light source at a predetermined angle. The optical member is formed of a reflective polarizing film with prisms that is provided with a plurality of elongated small prisms that are arranged in parallel to each other and aligned in a direction perpendicular to the reflection axis on a surface facing the liquid crystal display device. The reflective polarizing film with prisms is arranged in such a manner that the reflection axis of the reflective polarizing film with prisms faces a direction that crosses the absorption axis of the one polarizing plate at an angle of 90° or below.

Advantages of the invention will be set forth in the description that follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

First Embodiment

Figure 1:
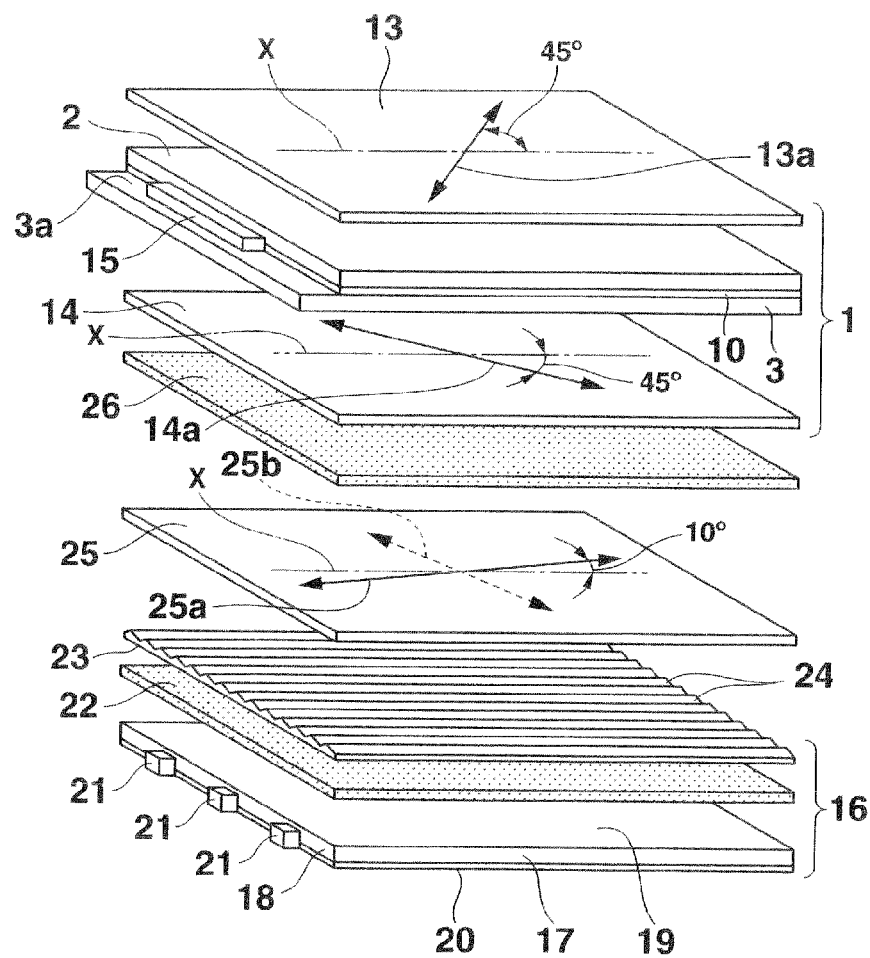
FIG. 1 is an exploded perspective view of a liquid crystal display apparatus showing a first embodiment according to the present invention.
Figure 2:
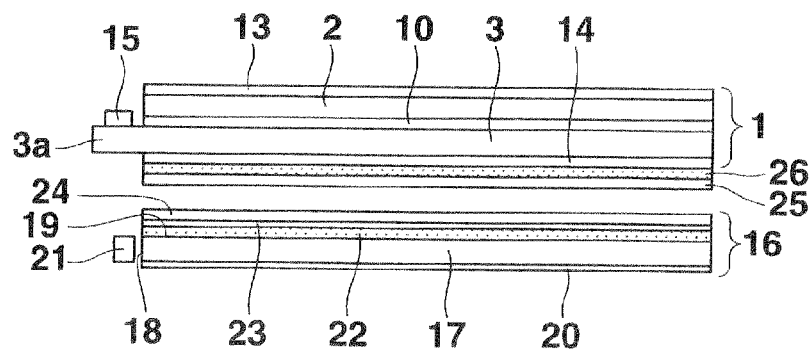
FIG. 2 is a side view of the liquid crystal display apparatus according the first embodiment.

FIGS. 1 to 4 show a first embodiment according to the present invention, and FIG. 1 is an exploded perspective view of a liquid crystal display apparatus whilst FIG. 2 is a side view of the liquid crystal display apparatus.

As shown in FIGS. 1 and 2, this liquid crystal display apparatus includes: a liquid crystal display device 1 to control transmission of light to perform display; a surface light source 16 that is arranged on an opposite side of an observation side of the liquid crystal display device 1, to irradiate illumination light toward the liquid crystal display device 1, and to reflect light that has entered from the observation side and has been transmitted through the liquid crystal display device 1 toward the liquid crystal display device 1; and an optical member 25 arranged between the liquid crystal display device 1 and the surface light source 16.

Figure 3:
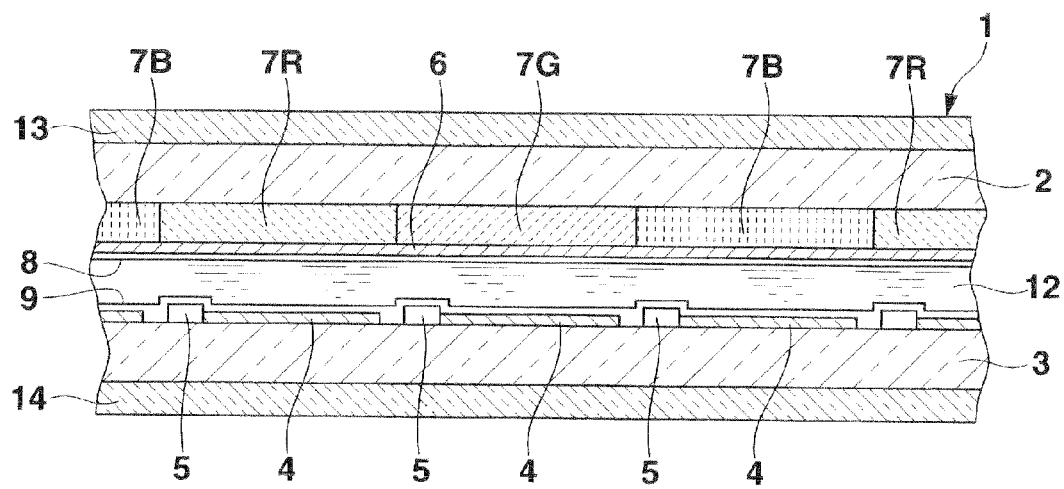
FIG. 3 is an enlarged cross-sectional view of a part of a liquid crystal display device.

FIG. 3 is an enlarged cross-sectional view showing a part of the liquid crystal display device 1. The liquid crystal display device 1 includes: a pair of transparent substrates 2 and 3 that are oppositely arranged to form a predetermined gap therebetween and have a plurality of transparent electrodes 4 and 6 formed on at least one of their surfaces facing each other; a liquid crystal layer 12 sealed into the gap between the substrates 2 and 3; and a pair of polarizing plates 13 and 14 arranged so as to sandwich the pair of substrates 2 and 3.

The liquid crystal display device 1 is, e.g., an active matrix liquid crystal display device. A plurality of pixel electrodes 4 arranged in a matrix form along a row direction and a column direction, a plurality of TFTs (thin film transistors) 5 arranged in accordance with the respective pixel electrodes 4, and a plurality of scanning lines to supply gate signals to the plurality of TFTs 5 in each row and a plurality of signal lines (these lines are not shown) to supply data signals to the plurality of TFTs 5 in each column are provided on an inner surface of one of the pair of substrates 2 and 3, e.g., the substrate (which will be referred to as a rear substrate hereinafter) 3 on the opposite side of the observation side. A single-film-like opposed electrode 6 that faces the plurality of pixel electrodes 4 is provided on an inner surface of the other substrate, i.e., the substrate (which will be referred to as a front substrate hereinafter) 2 on the observation side.

It is to be noted that the TFTs 5 are simplified in FIG. 2, but each TFT 5 is formed of a gate electrode formed on a substrate surface of the rear substrate 3, a transparent gate insulating film provided on substantially the whole substrate surface to cover the gate electrode, an i-type semiconductor film formed on the gate insulating film to face the gate electrode, and a drain electrode and a source electrode formed on both side portions of the i-type semiconductor film through an n-type semiconductor film. Each of the plurality of pixel electrodes 4 is formed on the gate insulating film and connected with the source electrode of each TFT 5 associated with each of these pixel electrodes 4.

Each of the plurality of scanning lines is formed on a plate surface of the rear substrate 3 along one side of each pixel electrode in accordance with each pixel electrode row, and connected with the gate electrodes of the plurality of TFTs 5 in each row. Each of the plurality of signal lines is formed on the gate insulating film along one side of each pixel electrode in accordance with each pixel electrode column, and connected with the drain electrodes of the plurality of TFTs in each column.

The liquid crystal display device 1 includes color filters 7R, 7G, and 7B having three colors, i.e., red, green, and blue provided in accordance with each of a plurality of pixels formed of regions where the plurality of pixel electrodes 4 face the opposed electrode 6. The color filters 7R, 7G, and 7B are provided on the inner surface of one of the pair of substrates, e.g., the observation-side substrate 2, and the opposed electrode 6 is formed on the color filters 7R, 7G, and 7B.

Alignment films 8 and 9 are formed on the inner surfaces of the pair of substrates 2 and 3 to cover the electrodes 4 and 6, and the inner surfaces of the pair of substrates 2 and 3 are subjected to an aligning treatment by rubbing film surfaces of the alignment films 8 and 9 in predetermined directions, respectively.

The pair of substrates 2 and 3 are bonded to each other through a frame-like sealing member 10 (see FIGS. 1 and 2) that surround a screen area where the plurality of pixels are arranged in the matrix form, and the liquid crystal layer 12 is sealed into a region surrounded by the sealing member 10 in the gap between these substrates 2 and 3.

Liquid crystal molecules in the liquid crystal layer 12 are aligned in an alignment state defined by the aligning treatments of the alignment films 8 and 9, and the pair of polarizing plates 13 and 14 arranged so as to sandwich the pair of substrates 2 and 3 are attached to outer surfaces of the pair of polarizing plates 13 and 14 in such a manner that absorption axes 13a and 14a of the polarizing plates 13 and 14 face directions along which display contrast can be sufficiently increased when an electric field is not applied across a space between the electrodes 4 and 6 and when an electric field is applied to the same.

Each of the pair of polarizing plates 13 and 14 is an absorption polarizing plate, having a transmission axis (not shown) and an absorption axis 13a or 14a perpendicular each other, to transmit linearly polarized light having a plane of vibration of light parallel to the transmission axis, and to absorb linearly polarized light having a plane of vibration of light parallel to the absorption axis 13a or 14a, and the observation-side polarizing plate 13 of these polarizing plates 13 and 14 is formed of an anti-glare polarizing plate having an outer surface subjected to external light antireflection treatment.

The liquid crystal display device 1 is, e.g., a TN-type liquid crystal display device, the alignment films 8 and 9 formed on the inner surfaces of the pair of substrates 2 and 3 are subjected to the aligning treatment in directions perpendicular to each other, and the liquid crystal molecules in the liquid crystal layer 12 are twist-aligned between the pair of substrates 2 and 3 at a twisted angle of substantially 90°.

The observation-side polarizing plate 13 of the pair of polarizing plates 13 and 14 is arranged in such a manner that the absorption axis 13a thereof is substantially perpendicular to or substantially parallel to the aligning treatment direction of the alignment film 8 on the inner surface of the substrate 2, and the rear (the opposite side of the observation side) polarizing plate 14 is arranged in such a manner that the absorption axis 14a thereof is substantially perpendicular to or substantially parallel to the absorption axis 13a of the observation-side polarizing plate 13.

In this embodiment, as shown in FIG. 1, the observation-side polarizing plate 13 is arranged in such a manner that the absorption axis 13a thereof faces an angular direction of 45° counterclockwise as seen from the observation side with respect to a lateral axis x of the screen, and the rear observation plate 14 is arranged in such a manner that the absorption axis 14a thereof faces an angular direction of 45° in a clockwise direction as seen from the observation side with respect to the lateral axis x of the screen.

The liquid crystal display device 1 is not restricted to the TN type liquid crystal display device, and it may be of any one of an STN type in which liquid crystal molecules are twist-aligned at a twisted angle in the range of 180° to 270° between the pair of substrates 2 and 3, a vertical alignment type in which the liquid crystal molecules are aligned substantially vertically to the surfaces of the substrates 2 and 3, a non-twisted horizontal alignment type in which the liquid crystal molecules are aligned in substantially parallel to the surfaces of the substrates 2 and 3 with molecular long axes being aligned in one direction, and bend alignment type in which the liquid crystal molecules are bent and aligned, or it may be a ferroelectric or anti-ferroelectric liquid crystal display device.

The liquid crystal display device 1 is not restricted to the configuration where the electrodes 6 and 4 required to form a plurality of pixels on the respective inner surfaces of the pair of substrates 2 and 3 are formed, and it may be of a transverse electric field control type having a configuration where a first electrode required to form a plurality of pixels is provided on the inner surface of one of the pair of substrates 2 and 3, e.g., the rear substrate 3, a second electrode having a plurality of elongated electrode units formed to be insulated from the first electrode is provided to be closer to the liquid crystal layer side and a transverse electric field (an electric field in a direction extending along the substrate surface) is generated between these electrodes to change an alignment state of liquid crystal molecules.

As shown in FIGS. 1 and 2, the rear substrate 3 of the liquid crystal display device 1 has a projecting portion 3a that protrudes toward the outside of the front substrate 2, and the plurality of scanning lines and signal lines provided on the inner surface of the rear substrate 3 are connected with a display driver mounted on the protruding portion 3a.

As shown in FIGS. 1 and 2, the surface light source 16 has a light guide plate 17 formed of a transparent tabular member having an area corresponding to an entire screen area of the liquid crystal display device 1, e.g., a tabular member formed into a entrance end face 18 that is composed of an end face associated with one of two narrow sides of the rectangular shape and through which light enters and an exit face 19 that is composed of one of two tabular surfaces and through which light that has entered the entrance end face 18 exits, and is arranged so that the exit face 19 faces the liquid crystal display device 1. The surface light source 16 further has a reflection film 20, which is provided on the opposite side of the exit face 19 of the light guide plate 17, to reflect the light that has entered the light guide plate 17 through the entrance end face 18 and the light that has entered through the exit face 19 toward the exit face 19, a plurality of light-emitting devices 21 formed of LEDs (light-emitting diodes) arranged to face the entrance end face 18 of the light guide plate 17, and a diffusion sheet 22 and at least one (one in this embodiment) prism array 23 that are arranged on the exit face side of the light guide plate 17.

The diffusion sheet 22 is formed of a resin film in which scattering particles are dispersed, arranged between the light guide plate 17 and the prism array 23, and attached to an upper side of the exit face 19 of the light guide plate 17.

The prism array 23 is formed of a transparent member that has a surface formed into a flat surface on a side facing the light guide plate 17, and is provided with a plurality of elongated small prisms 24 that are arranged in parallel to each other and aligned in a direction perpendicular to a longitudinal direction thereof on a surface of the transparent member on an opposite side, i.e., a surface on a side facing the liquid crystal display device 1, and configured to collect the light that has exited the light guide plate 17 through the exit face 19 to apply the collected light to the liquid crystal display device 1. In the prism array 23, the plurality of small prisms 24 are arranged in such a manner the longitudinal direction thereof is substantially parallel to a predetermined direction, e.g., a normal direction (a longitudinal direction of the light guide plate 17) of the entrance end face 18 of the light guide plate 17, and the flat surface is attached to the upper side of the diffusion sheet 22.

In the surface light source 16, when performing transmissive display utilizing illumination light from the surface light source 16, the plurality of light-emitting devices 21 are turned on, and light that has been emitted from these light-emitting devices 21 and has entered the light guide plate 17 through the entrance end face 18 is led to the entire region of the light guide plate 17 while repeating reflection by the reflection film 20 and internal reflection by the exit face 19 of the light guide plate 17 so that the light exits the light guide plate 17 through the entire exit face 19. This light is diffused by the diffusion sheet 22, collected by the plurality of small prisms 24 of the prism array 23 in the direction perpendicular to the longitudinal direction of these small prisms 24, so that the illumination light having a luminance distribution with high front luminance (luminance of light exiting in a direction near a normal line of the liquid crystal display device 1) is irradiated toward the liquid crystal display device 1.

The surface light source 16 has a function of reflecting toward the liquid crystal display device 1 the light that has entered the liquid crystal display device 1 from the observation side and has been transmitted through the liquid crystal display device 1. The light that has been transmitted through the liquid crystal display device 1, further transmitted through the optical member 25, the prism array 23, and the diffusion sheet 22 without being reflected toward the observation side, and has entered the light guide plate 17 through the exit face 19 is reflected by the reflection film 20 to exit from the entire exit face 19 of the light guide plate 17. This light is diffused by the diffusion sheet 22 and collected by the plurality of small prisms 24 of the prism array 23, so that the reflected light having the luminance distribution with high front luminance is applied toward the liquid crystal display device 1.

In the surface light source according to this embodiment, the reflection film 20 is provided on the tabular surface of the light guide plate 17 on the opposite side of the exit face 19. However, the reflection film 20 may be arranged to have a gap between itself and the light guide plate 17 so that the light that has entered the light guide plate 17 from the entrance end face 18 is internally reflected by the tabular surface of the light guide plate 17 on the opposite side of the exit face 19 toward the exit face 19 and leakage light that has been transmitted though an interface of the tabular plate on the opposite side and an air layer in the gap is reflected by the reflection film 20 to be returned to the inside of the light guide plate 17.

The optical member 25, which has a reflection axis 25a and a transmission axis 25b perpendicular to each other, is to reflect linearly polarized light having a plane of vibration of light parallel to the reflection axis 25a, and to transmit linearly polarized light having a plane of vibration of light parallel to the transmission axis 25b. The optical member 25 is arranged between the liquid crystal display device 1 and the surface light source 16 in such a manner that the reflection axis 25a faces a direction that crosses the absorption axis 14a of the polarizing plate of the liquid crystal display device 1 on the surface light source 16 side, i.e., the rear polarizing plate 14 at predetermined angle.

The optical member 25 is formed of a reflective polarizing film. The reflective polarizing film 25 is arranged in such a manner that its reflection axis 25a faces a direction that crosses the absorption axis 14a of the polarizing plate of the liquid crystal display device 1 on the surface light source 16 side, i.e., the rear polarizing plate 14, at an angle falling within the range of 15° to 90°.

The liquid crystal display apparatus includes, between the liquid crystal display device 1 and the reflective polarizing film 25, a diffusion layer 26 to diffuse light that has been applied from the surface light source 16 side and transmitted through the reflective polarizing film 25 and light that has entered from the observation side and has been reflected by the reflective polarizing film 25 so that these lights enter the rear polarizing plate 14 of the liquid crystal display device 1, so as to increase luminance of the light that is transmitted through the rear polarizing plate 14, and so as to cause the liquid crystal display device 1 to display an image having a wide viewing angle and no luminance unevenness. The diffusion layer 26 is formed of a pressure sensitive adhesive in which scattering particles are dispersed, and the reflective polarizing film 25 is attached to an outer surface of the rear polarizing plate 14 of the liquid crystal display device 1 by the diffusion layer 26 formed of the pressure sensitive adhesive.

A crossing angle of the reflection axis 25a of the reflective polarizing film 25 with respect to the absorption axis 14a of the rear polarizing plate 14 of the liquid crystal display device 1 (which will be referred to as a crossing angle α hereinafter) is preferably set to an angle falling within the range of 45° to 90° or more preferably set to an angle falling within the range of 55° to 65°.

In this embodiment, as shown in FIG. 1, the reflective polarizing film 25 is arranged in such a manner that the reflection axis 25a thereof faces an angular direction of 10° counterclockwise with respect to a lateral axis x of the screen as seen from the observation side, and the crossing angle α of the reflection axis 25a of the reflective polarizing film 25 with respect to the absorption axis 14a of the rear polarizing plate 14 of the liquid crystal display device 1 is set to 55°.

In the liquid crystal display apparatus, the surface light source 16 to irradiate illumination light toward the liquid crystal display device 1 and to reflect the light that has entered from the observation side and has been transmitted through the liquid crystal display device 1 toward the liquid crystal display device 1 is arranged on the opposite side of the observation side of the liquid crystal display device 1, and the reflective polarizing film 25 to reflect a part of the light that has entered from the observation side and has been transmitted through the liquid crystal display device 1 toward the liquid crystal display device 1 is arranged between the liquid crystal display device 1 and the surface light source 16 in such a manner that the reflection axis 25a thereof faces the direction that crosses the absorption axis 14a of the rear polarizing plate 14 of the liquid crystal display device 1 at a predetermined angle (an angle falling within the range of 15° to 90° in this embodiment). Therefore, reflective display that utilizes external light that has entered from the observation side and transmissive display that utilizes illumination light from the surface light source 16 arranged on the opposite side of the observation side can be carried out, and brightness in the reflective display can be increased.

In the reflective display, the light that has entered from the observation side and has been transmitted through the liquid crystal display device 1, i.e., linearly polarized light that is perpendicular to the absorption axis 14a of the rear polarizing plate 14 of the liquid crystal display device 1 enters the reflective polarizing film 25.

Since the reflection axis 25a of the reflective polarizing film 25 crosses the absorption axis 14a of the rear polarizing plate 14 of the liquid crystal display device 1 at the predetermined axis, a linearly polarized light component parallel to the reflection axis 25a of the reflective polarizing film 25 in the light that has been transmitted through the liquid crystal display device 1 (the linearly polarized light that is perpendicular to the absorption axis 14a of the rear polarizing plate 14) is reflected by the reflective polarizing film 25. This reflected light is partially diffused by the diffusion layer 26, and a linearly polarized light component that is perpendicular to the absorption axis 14a of the rear polarizing plate 14 of the liquid crystal display device 1 in the diffused light is transmitted through the liquid crystal display device 1 to exit toward the observation side.

On the other hand, a linearly polarized light component that is parallel to the transmission axis 25b of the reflective polarizing film 25 in the light that has been transmitted through the liquid crystal display device 1 is transmitted through the reflective polarizing film 25 to exit toward the surface light source 16 side.

The light that has been transmitted through the reflective polarizing film 25 to exit toward the surface light source 16 side is partially reflected toward the observation side by the prism array 23 arranged on the exit side of the surface light source 16, and the light that has been transmitted through the prism array 23 is diffused by the diffusion sheet 22. The light that has been partially reflected and transmitted through the diffusion sheet 22 enters the light guide plate 17 through the exit face 19 and is reflected by the reflection film 20 provided on the opposite of the exit face 19 of the light guide plate 17.

The reflected light exits the light guide plate 17 through the exit face 19 to be diffused by the diffusion sheet 22, and it is collected by the prism array 23 to enter the reflective polarizing film 25. A linearly polarized light component parallel to the transmission axis 25b of the reflective polarizing film 25 in this light is transmitted through the reflective polarizing film 25, and a part of this light is diffused by the diffusion layer 26. Linearly polarized light perpendicular to the absorption axis 14a of the rear polarizing plate 14 of the liquid crystal display device 1 in this diffused light is transmitted through the liquid crystal display device 1 to exit toward the observation side.

Further, in the transmissive display, the illumination light applied from the surface light source 16, i.e., the light that has exited the light guide plate 17 through the exit face 19 to be diffused by the diffusion sheet 22 and collected by the prism array 23 enters the reflective polarizing film 25. A linearly polarized light component parallel to the transmission axis 25b of the reflective polarizing film 25 in this light is transmitted through the reflective polarizing film 25 and partially diffused by the diffusion layer 26 to exit toward the liquid crystal display device 1 side.

The light that has existed to the liquid crystal display device 1 side enters the rear polarizing plate 14 of the liquid crystal display device 1. Linearly polarized light perpendicular to the absorption axis 14a of the rear polarizing plate 14 in this light enters the liquid crystal display device 1 through the rear polarizing plate 14, and light that has been transmitted through the liquid crystal display device 1 in this incident light exits to the observation side.

In this liquid crystal display apparatus, a ratio of light that is reflected by the reflective polarizing film 25 and the surface light source 16 and transmitted through the liquid crystal display device 1 to exit toward the observation side with respect to light that has entered from the observation side, which will be referred to as a reflectance hereinafter, and a ratio of light that is transmitted through the reflective polarizing film 25 and the liquid crystal display device 1 to exit toward the observation side with respect to light applied from the surface light source 16, which will be referred to as a transmittance hereinafter, are dependent on the crossing angle α of the reflection axis 25a of the reflective polarizing film 25 with respect to the absorption axis 14a of the rear polarizing plate 14 of the liquid crystal display device 1.

Figure 4:
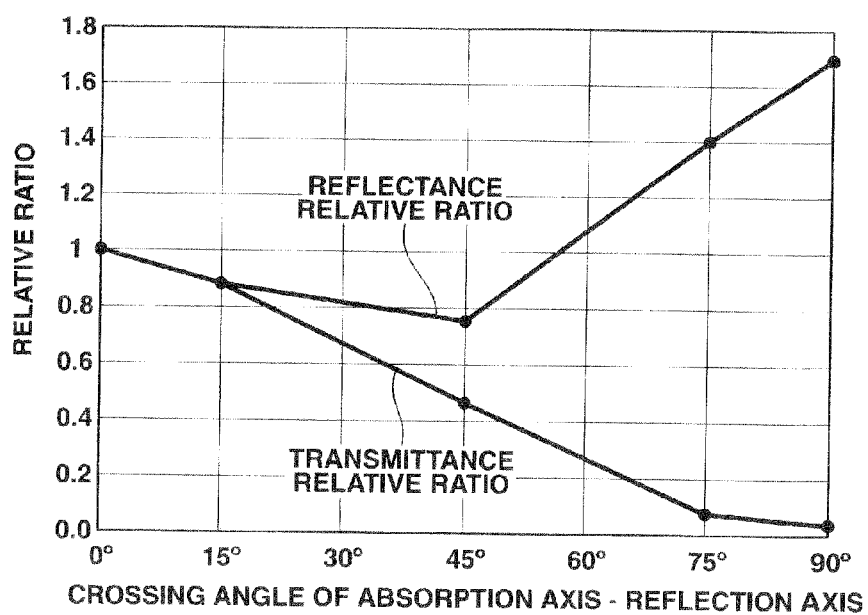
FIG. 4 is a view showing changes in a reflectance relative ratio and a transmittance relative ratio associated with a crossing angle of a reflection axis of a reflective polarizing film with respect to an absorption axis of a rear polarizing plate of the liquid crystal display device in the liquid crystal display apparatus according to the first embodiment.

Here, a ratio of a reflectance at an arbitrary crossing angle α with respect to a reflectance when the reflection axis 25a of the reflective polarizing film 25 is parallel to the absorption axis 14a of the rear polarizing plate 14 (the crossing angle α with respect to the absorption axis 14a of the rear polarizing plate 14 is 0° is determined as a reflectance relative ratio, and a ratio of a transmittance at an arbitrary crossing angle α with respect to a transmittance when the reflection axis 25a of the reflective polarizing film 25 is parallel to the absorption axis 14a of the rear polarizing plate 14 of the liquid crystal display device 1 (the crossing angle α is 0° is determined as a transmittance relative ratio. FIG. 4 shows changes in the reflectance relative ratio and the transmittance relative ratio with respect to the crossing angle α.

That is, FIG. 4 shows ratios of the reflectance and the transmittance at each crossing angle α when each of the reflectance and the transmittance is "1" at the crossing angle α (the crossing angle of the absorption axis and the reflection axis) of 0°. As apparent from FIG. 4, the reflectance relative ratio becomes larger than the transmittance relative ratio when the crossing angle α exceeds 15°, and the reflectance relative ratio shifts to an increase from a decrease and an increasing rate thereof rises when the crossing angle α exceeds 45°.

That is, in this embodiment, the luminance in the transmissive display is reduced and the luminance in the reflective display is increased in the range that the crossing angle α is larger than 15°.

The transmittance relative ratio is reduced as the crossing angle α increases in the range where the crossing angle α of the reflection axis 25a of the reflective polarizing film 25 with respect to the absorption axis 14a of the rear polarizing plate 14 is 0° to 90°.

As shown in FIG. 4, in the liquid crystal display apparatus according to this embodiment, in the range that the crossing angle α is larger than 0° and equal to or below 90°, the transmittance relative ratio and the reflectance relative ratio have almost no difference when the crossing angle α is 0° to 15°, the reflectance relative ratio becomes larger than the transmittance relative ratio when the crossing angle α is equal to or above 15°, and a difference between these ratios increases as the crossing angle α becomes larger. In particular, when the crossing angle α is equal to or above 45°, the difference between the reflectance relative ratio and the transmittance relative ratio is further increased. As explained above, the reflectance relative ratio can be varied by changing the crossing angle α. When the reflectance relative ratio is larger than 1, visibility when external light illuminance is high can be further improved.

Therefore, in the liquid crystal display apparatus, the reflectance relative ratio can be set larger than the transmittance relative ratio to provide the bright reflective display when the crossing angle α is set to an angle failing within the range of 15° to 90°. In particular, it is more preferable to set the crossing angle α to an angle falling within in the range of 65° to 90°. When such a setting is adopted, the reflectance relative ratio is increased, so that the reflective display bright to the eyes can be provided.

In this liquid crystal display apparatus, it is desirable to set the crossing angle α to fall within the range of 45° to 90° corresponding to angles at which the reflectance relative ratio shift to an increase from a decrease. When such a setting is adopted, the reflectance relative ratio can be set to be sufficiently higher than the transmittance relative ratio.

It is more preferable to set the crossing angle α to an angle falling within the range of 55° to 65°. When such a setting is adopted, the reflectance relative ratio can be set to be higher than 1.0, more bright reflective display can be effected, and the transmittance relative ratio of 0.3 to 0.2 can be assured.

Since the brightness of the transmissive display is associated with the luminance of illumination light from the surface light source 16 and the transmittance relative ratio, setting the luminance of the illumination light in accordance with the transmittance relative ratio enables effecting the sufficiently bright transmissive display.

Second Embodiment

Figure 5:
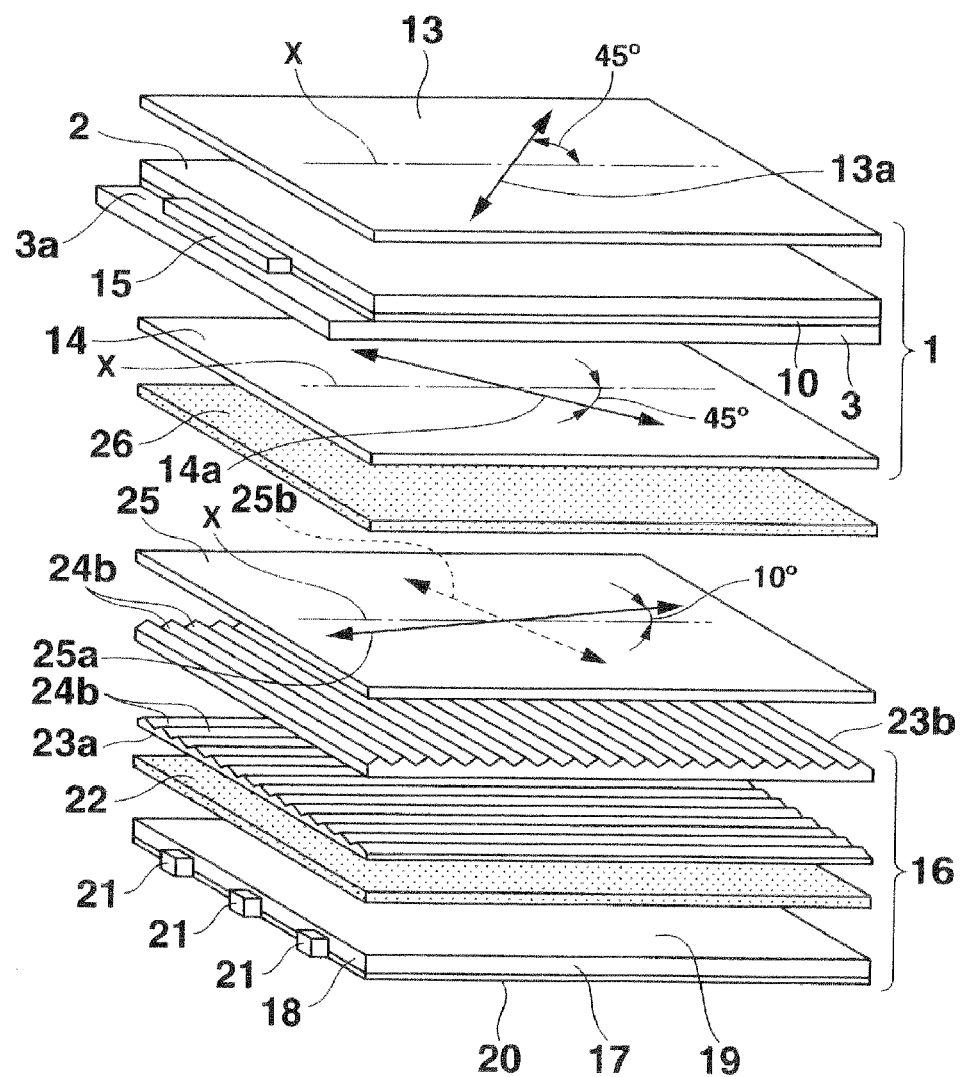
FIG. 5 is an exploded perspective view of a liquid crystal display apparatus showing a second embodiment according to the present invention.

FIG. 5 is an exploded perspective view of a liquid crystal display apparatus showing a second embodiment according to the present invention. It is to be noted that, in this embodiment, like reference numerals denote parts corresponding to those in the first embodiment, thereby omitting a description thereof.

A liquid crystal display apparatus according to this embodiment has a configuration that first and second two prism arrays 23a and 23b are provided to be laminated on each other on an exit side of a surface light source 16 (an exit face side of a light guide plate 17) in place of the prism array 23 in the liquid crystal display apparatus according to the first embodiment, and other structures are the same as those in the first embodiment.

In this embodiment, each of the two prism arrays 23a and 23b of the surface light source 16 is formed of a transparent member that has a surface formed into a flat surface on a side facing the light guide plate 17, and is provided with a plurality of elongated small prisms 24a or 24b that are arranged in parallel to each other and aligned in a direction perpendicular to a longitudinal direction thereof on a surface of the transparent member on an opposite side, i.e., a surface on a side facing a liquid crystal display device 1, and configured to collect light exiting from an exit face 19 of the light guide plate 17 to apply the collected light to the liquid crystal display device 1.

The first prism array 23a on the light guide plate 17 side is arranged in such a manner that the longitudinal direction of the plurality of small prisms 24a thereof is substantially parallel to a predetermined direction, e.g., a normal direction (a longitudinal direction of the light guide plate 17) of an entrance end face 18 of the light guide plate 17, and it is attached to an upper side of a diffusion sheer 22 bonded to an upper side of the exit face 19 of the light guide plate 17. The second prism array 23b is arranged in such a manner that the longitudinal direction of the plurality of small prisms 24a thereof is substantially perpendicular to the longitudinal direction of the plurality of small prisms 24a of the first prism array 23a, and it is in contact with or in close proximity to an upper side of the first prism array 23a.

In the liquid crystal display apparatus according to this embodiment, since the two prism arrays 23a and 23b are arranged on the exit side of the surface light source 16 in such a manner that the longitudinal directions of the small prisms 24a and 24b are perpendicular to each other, light that has entered from an observation side and has been reflected by the surface light source 16 and illumination light applied from the surface light source 16 can be collected in a direction perpendicular to the longitudinal direction of the plurality of small prisms 24a of the first prism array 23a and a direction perpendicular to the longitudinal direction of the plurality of small prisms 24b of the second prism array 23b, so that light having a luminance distribution with higher front luminance to the liquid crystal display device 1, which allows brighter reflective display and transmissive display.

Third Embodiment

Figure 6:
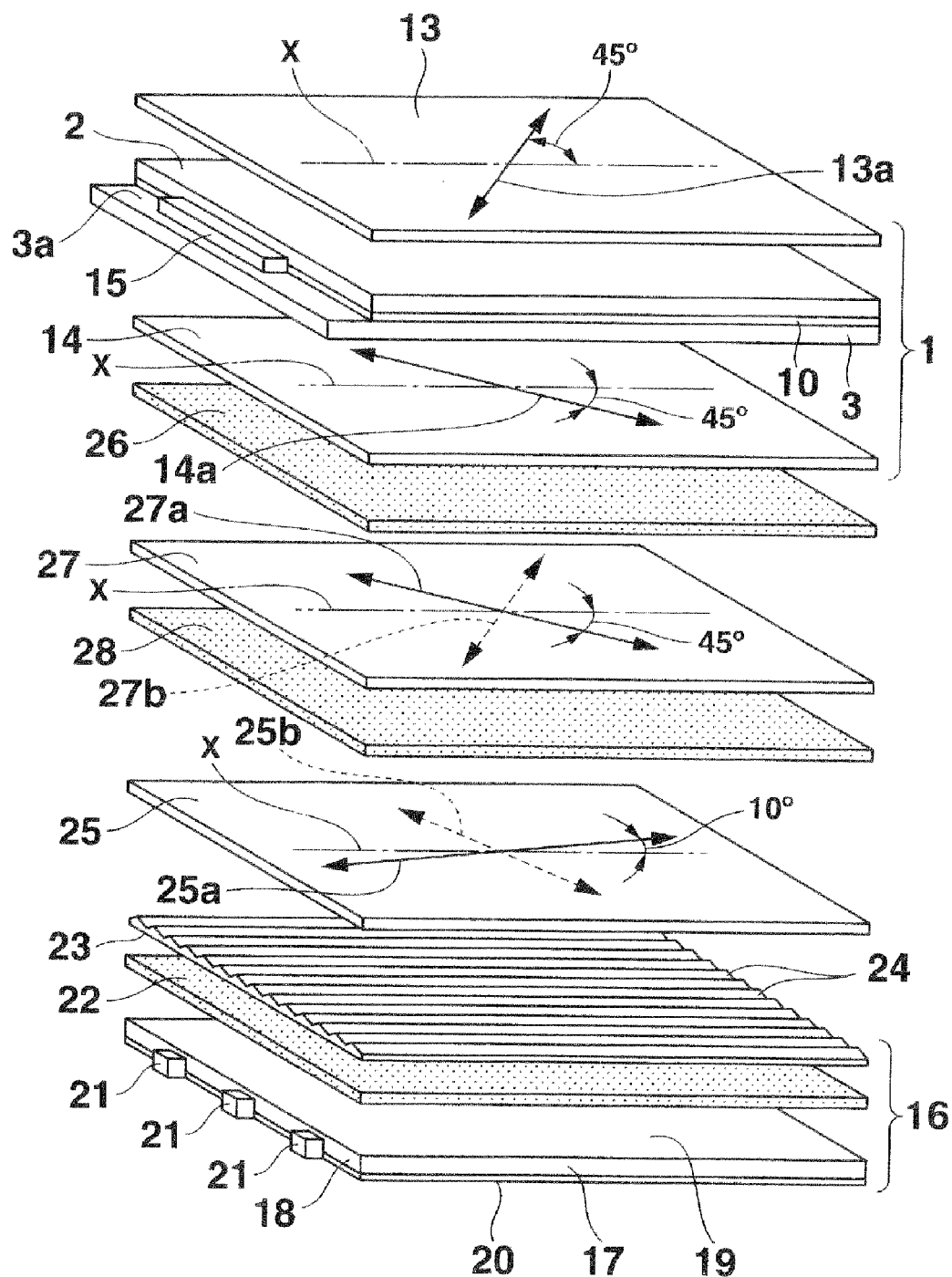
FIG. 6 is an exploded perspective view of a liquid crystal display apparatus showing a third embodiment according to the present invention.
Figure 7:
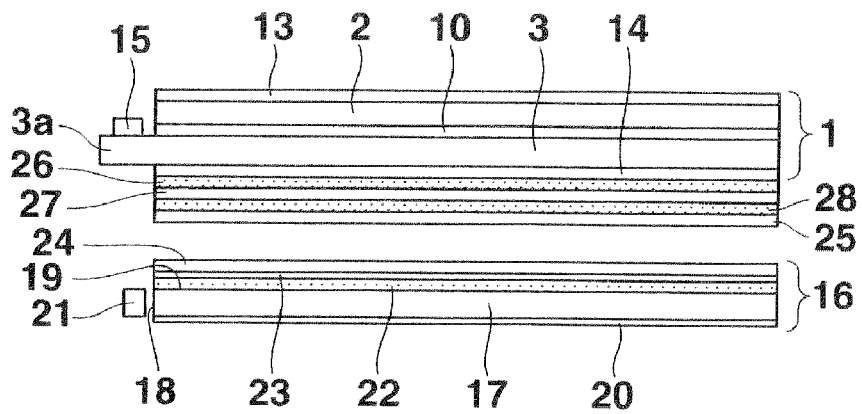
FIG. 7 is a side view of the liquid crystal display apparatus according to the third embodiment.
Figure 8:
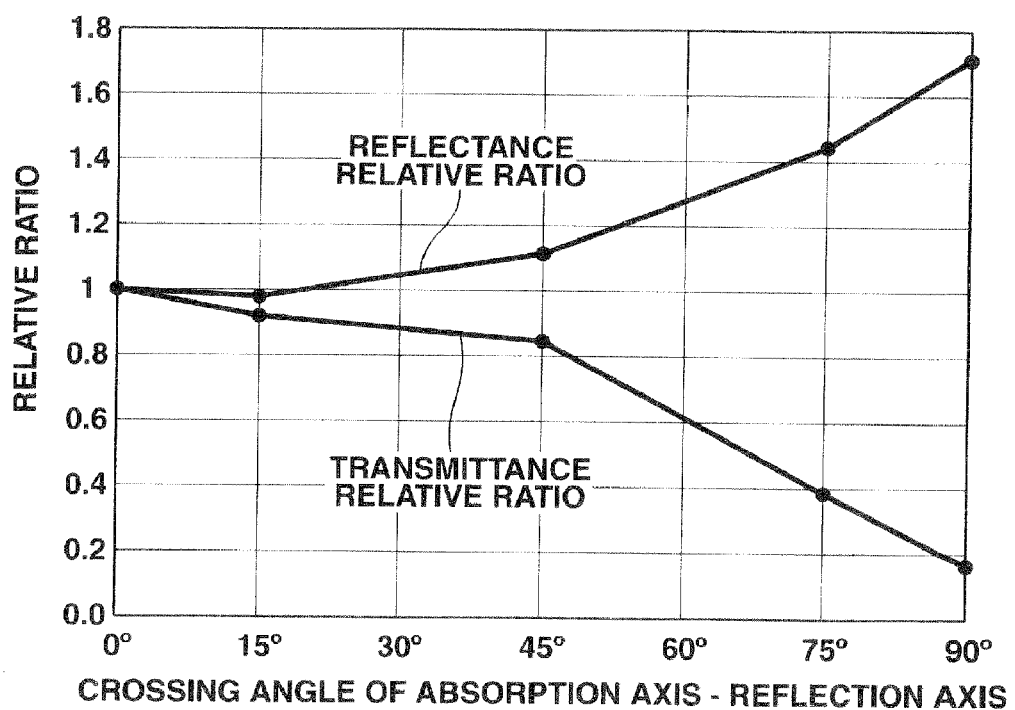
FIG. 8 is a view showing changes in a reflectance relative ratio and a transmittance relative ratio associated with a crossing angle of a reflection axis of a reflective polarizing film with respect to an absorption axis of a rear polarizing plate of the liquid crystal display device in the liquid crystal display apparatus according to the third embodiment.

FIGS. 6 to 8 show a third embodiment according to the present invention, and FIG. 6 is an exploded perspective view of a liquid crystal display apparatus, and FIG. 7 is a side view of the liquid crystal display apparatus. It is to be noted that, in this embodiment, like reference numerals denote parts corresponding to those in the first embodiment, thereby omitting a description thereof.

A liquid crystal display apparatus according to this embodiment has a configuration where a reflective polarizing plate 27, which has a reflection axis 27a and a transmission axis 27h perpendicular to each other, to reflect linearly polarized light having a plane of vibration of light parallel to the reflection axis 27a, and to transmit linearly polarized light having a plane of vibration of light parallel to the transmission axis 27b, is provided between the liquid crystal display device 1 and the reflective polarizing film 25 in such a manner that the reflection axis 27a is substantially parallel to an absorption axis 14a of a rear polarizing plate 14 of the liquid crystal display device 1, and a diffusion layer 28 having a haze value of 10 to 90% is provided between the reflective polarizing film 25 and the reflective polarizing plate 27 in the liquid crystal display apparatus according to the first embodiment, and other structures are the same as those in the first embodiment.

The diffusion layer 28 arranged between the reflective polarizing film 25 and the reflective polarizing plate 27 is formed of a pressure sensitive adhesive in which scattering particles are diffused, the reflective polarizing plate 27 is attached to an outer surface of the rear polarizing plate 14 of the liquid crystal display device 1 by a diffusion layer (a diffusion layer that is used for increasing luminance of light that is transmitted through the rear polarizing plate 14 of the liquid crystal display device 1 and displaying an image having a wide viewing angle and no luminance unevenness in the liquid crystal display device 1) 26 formed of a pressure sensitive adhesive in which scattering particles are dispersed, and the reflective polarizing film 25 is attached to the reflective polarizing plate 27 by the diffusion layer 28.

In this liquid crystal display apparatus, the reflective polarizing film 25 is arranged in such a manner that a reflection axis 25a thereof faces a direction that crosses the absorption axis 14a of the rear polarizing plate 14 of the liquid crystal display device 1 at an angle larger than 0° and equal to or below 90°.

It is preferable to set a crossing angle of the reflection axis 25a of the reflective polarizing film 25 with respect to the absorption axis 14a of the rear polarizing plate 14 of the liquid crystal display device 1 to an angle failing within the range of 20° to 90°, or more preferable to set the same to an angle falling within the range of 20° to 85°, or further preferable to set the same to an angle falling within the range of 45° to 85°.

In this embodiment, as shown in FIG. 6, the reflective polarizing film 25 is arranged in such a manner that the reflection axis 25a thereof faces an angular direction of 10° counterclockwise with respect to a lateral axis x of a screen as seen from an observation side, and the crossing angle α of the reflection axis 25a of the reflective polarizing film 25 with respect to the absorption axis 14a of the rear polarizing plate 14 of the liquid crystal display device 1 is set to 55°.

In the liquid crystal display apparatus, since the reflective polarizing plate 27 is arranged between the liquid crystal display device 1 and the reflective polarizing film 25 in such a manner that the reflection axis 27a thereof is substantially parallel to the absorption axis 14a of the rear polarizing plate 14 of the liquid crystal display device 1, the reflectance relative ratio can be increased to be larger than the transmittance relative ratio when the crossing angle α of the reflection axis 25a of the reflective polarizing film 25 with respect to the absorption axis 14a of the rear polarizing plate 14 of the liquid crystal display device 1 is larger than 0° and equal to or below 90°.

In this liquid crystal display apparatus, at the time of reflective display, light that has entered from the observation side and has been transmitted through the liquid crystal display device 1, i.e., linearly polarized light that is perpendicular to the absorption axis 14a of the rear polarizing plate 14 of the liquid crystal display device 1 is transmitted through the reflective polarizing plate 27 and further transmitted through the diffusion layer 28 to enter the reflective polarizing film 25.

The reflective polarizing film 25 is arranged in such a manner that the reflection axis 25a thereof faces a direction that crosses the absorption axis 14a of the rear polarizing plate 14 and the reflection axis 27a of the reflective polarizing plate 27 in the liquid crystal display device 1 at an angle of 90° or below. Therefore, a linearly polarized light component parallel to the reflection axis 25a of the reflective polarizing film 25 in light that has been transmitted through the reflective polarizing plate 27 is reflected by the reflective polarizing film 25, and linearly polarized light parallel to the transmission axis 27b of the reflective polarizing plate 27 in reflected light partially diffused by the diffusion layer 28 is again transmitted through the reflective polarizing plate 27 and further transmitted through the liquid crystal display device 1 to exit toward the observation side.

Furthermore, linearly polarized light parallel to the reflection axis 27a of the reflective polarizing plate 27 in light that has entered the reflective polarizing film 25 through the reflective polarizing plate 27 and has been reflected by this reflective polarizing film 25 to be partially diffused by the diffusion layer 28 is again reflected by the reflective polarizing plate 27 and again partially diffused by the diffusion layer 28 to enter the reflective polarizing film 25. A linearly polarized tight component parallel to the reflection axis 25a of the reflective polarizing film 25 in this light is reflected by the reflective polarizing film 25. Linearly polarized light parallel to the transmission axis 27b of the reflective polarizing plate 27 in reflected light partially diffused by the diffusion layer 28 is transmitted through the reflective polarizing plate 27. Linearly polarized light parallel to the reflection axis 27a of the reflective polarizing plate 27 that has been transmitted through the liquid crystal display device 1 to exit the observation side is reflected by the reflective polarizing plate 27 to again enter the reflective polarizing film 25.

Then, this process is repeated. Therefore, the light that has entered from the observation side and has been transmitted through the liquid crystal display device 1 and the reflective polarizing plate 27 to be reflected by the reflective polarizing film 25 can be efficiently transmitted through the reflective polarizing plate 27 and the liquid crystal display device 1 to exit to observation side by a recycle effect based on repeating the reflection between the reflective polarizing film 25 and the reflective polarizing plate 27.

On the other hand, a linearly polarized light component parallel to the transmission axis 25b of the reflective polarizing film 25 in the light that has entered from the observation side and has been transmitted through the liquid crystal display device 1 and the reflective polarizing plate 27 to enter the reflective polarizing film 25 is transmitted through the reflective polarizing film 25 to exit to the surface light source 16 side and reflected by the surface light source 16 like the liquid crystal display apparatus according to the first embodiment.

The light reflected by the surface light source 16 enters the reflective polarizing film 25. In this light, a linearly polarized light component parallel to the transmission axis 25b of the reflective polarizing film 25 is transmitted through the reflective polarizing film 25 to enter the reflective polarizing plate 27.

In reflected light that has been reflected by the surface light source 16 and transmitted through the reflective polarizing film 25 to enter the reflective polarizing plate 27, linearly polarized light parallel to the transmission axis 27b of the reflective polarizing plate 27 is transmitted through the reflective polarizing plate 27 and further transmitted through the liquid crystal display device 1 to exit to the observation side. Linearly polarized light parallel to the reflection axis 27a of the reflective polarizing plate 27 is reflected by the reflective polarizing plate 27 to again enter the reflective polarizing film 25.

Therefore, the light that has been reflected by the surface light source 16 and transmitted through the reflective polarizing film 25 can be also efficiently transmitted through the reflective polarizing plate 27 and the liquid crystal display device 1 to exit to the observation side by the recycle effect based on repeating the reflection between the reflective polarizing film 25 and the reflective polarizing plate 27.

Moreover, in the liquid crystal display apparatus according to this embodiment, the diffusion layer 28 having a haze value of 10 to 90% is arranged between the reflective polarizing film 25 and the reflective polarizing plate 27, and the light reflected by the reflective polarizing film 25 is diffused by the diffusion layer 28 to enter the reflective polarizing plate 27. Therefore, the recycle effect can be enhanced, and a ratio of light that is again transmitted through the reflective polarizing plate 27 and further transmitted through the liquid crystal display device 1 to exit to the observation side can be increased.

Additionally, at the time of reflective display, illumination light applied from the surface light source 16 enters the reflective polarizing film 25. In this light, a linearly polarized light component parallel to the transmission axis 25b of the reflective polarizing film 25 is transmitted through the reflective polarizing film 25 to enter the reflective polarizing plate 27. In this light, linearly polarized light parallel to the transmission axis 27b of the reflective polarizing plate 27 is transmitted through the reflective polarizing plate 27 and further transmitted through the liquid crystal display device 1 to exit to the observation side.

Further, in the light that has been transmitted through the reflective polarizing film 25 to enter the reflective polarizing plate 27, linearly polarized light parallel to the reflection axis 27a of the reflective polarizing plate 27 is reflected by the reflective polarizing plate 27 to again enter the reflective polarizing film 25 and transmitted through the reflective polarizing plate 27 and the liquid crystal display device 1 to exit to the observation side by the recycle effect.

In this liquid crystal display apparatus, a reflectance in the reflective display and a transmittance in the transmissive display are dependent on the crossing angle of the reflection axis 25a of the reflective polarizing film 25 with respect to the absorption axis 14a of the rear polarizing plate 14 of the liquid crystal display device 1.

In the liquid crystal display apparatus according to this embodiment, since the reflective polarizing plate 27 is arranged between the liquid crystal display device 1 and the reflective polarizing film 25, the reflectance can be improved up to 1.72-fold as compared with the liquid crystal display apparatus according to the first embodiment that does not include the reflective polarizing plate 27. Furthermore, in the liquid crystal display apparatus according to this embodiment, since the diffusion layer 28 is arranged between the reflective polarizing film 25 and the reflective polarizing plate 27, the reflectance in the reflective display is increased to approximately 1.02-fold and the transmittance in the transmissive display is reduced to approximately 0.98-fold as compared with an example where this diffusion layer 28 is not included.

FIG. 8 shows changes in a reflectance relative ratio and a transmittance relative ratio associated with the crossing angle α of the reflection axis 25a of the reflective polarizing film 25 with respect to the absorption axis 14a of the rear polarizing plate 14 of the liquid crystal display device 1 in the liquid crystal display apparatus.

As shown in FIG. 8, in the liquid crystal display apparatus, the transmittance relative ratio is reduced as the crossing angle α increases in the range of 0° to 90°. On the other hand, the reflectance relative ratio substantially has no change when the crossing angle α falls in the range of 0° to 15°, the same increases as the crossing angle α becomes larger in the range of 15° to 90°, and the same further increases as the crossing angle α becomes larger in the range of 45° to 90° in particular.

Further, assuming that each of the reflectance relative ratio and the transmittance relative ratio is 1.0 when the crossing angle α is 0°, the reflectance relative ratio becomes larger than the transmittance relative ratio at all crossing angles α larger than 0° and equal to or below 90°. A difference between these ratios increases as the crossing angle α become larger. The difference between the reflectance relative ratio and the transmittance relative ratio further increases when the crossing angle becomes equal to or above 45° in particular.

Therefore, in the liquid crystal display apparatus, the reflectance relative ratio is set to be larger than the transmittance relative ratio by setting the crossing angle α to be larger than 0° and equal to or below 90°, thereby providing the brighter reflective display. When the crossing angle α is changed in this manner, the reflectance relative ratio can be varied. If the reflectance relative ratio is larger than 1, visibility when external light illuminance is high can be improved.

In this liquid crystal display apparatus, it is desirable to set the crossing angle α to an angle falling within the range of 20° to 90°. When such a setting is adopted, the reflectance relative ratio can be increased to be larger than 1.0, and the brighter reflective display can be effected. In particular, it is more preferable to set the crossing angle α to an angle falling within the range of 53° to 90°. When such a setting is adopted, the reflectance relative ratio is increased, so that the reflective display bright to the eyes can be provided.

It is preferable to set the crossing angle α to an angle falling within the range of 20° to 85°. Adopting such a setting enables assuring the transmittance relative ratio of 0.9 to 0.2, thereby providing the sufficiently bright transmissive display.

It is more preferable to set the crossing angle α to an angle falling within the range of 45° to 85°. Adopting such a setting enables increasing the reflectance relative ratio to be sufficiently larger than the transmittance relative ratio.

Although the diffusion layer 28 is arranged between the reflective polarizing film 25 and the reflective polarizing plate 27 in the third embodiment, this diffusion layer 28 does not have to be provided. In such a case, the reflectance relative ratio can be increased to be larger than the transmittance relative ratio, and the brighter reflective display can be provided.

Furthermore, although the surface light source 16 includes the single prism array 23 in the third embodiment, the surface light source 16 may include two prism arrays 23a and 23b like the second embodiment.

Fourth Embodiment

Figure 9:
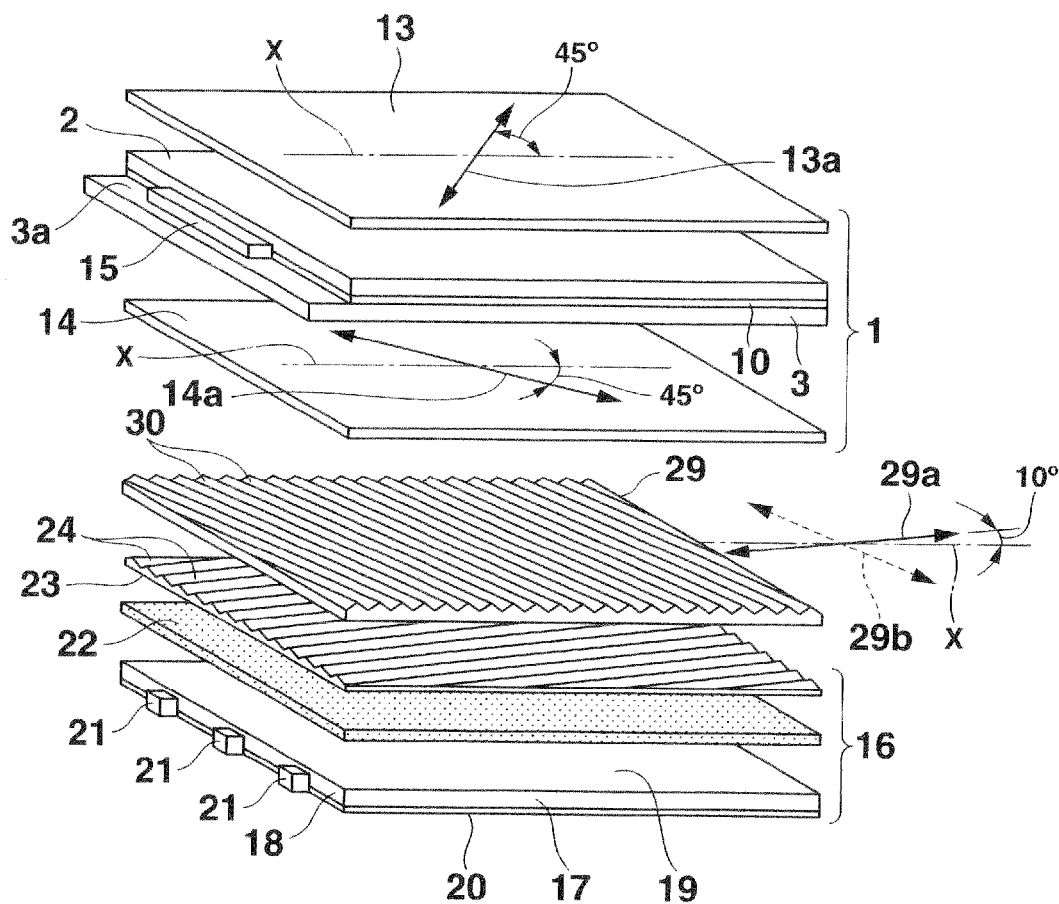
FIG. 9 is an exploded perspective view of a liquid crystal display apparatus showing a fourth embodiment according to the present invention.
Figure 10:
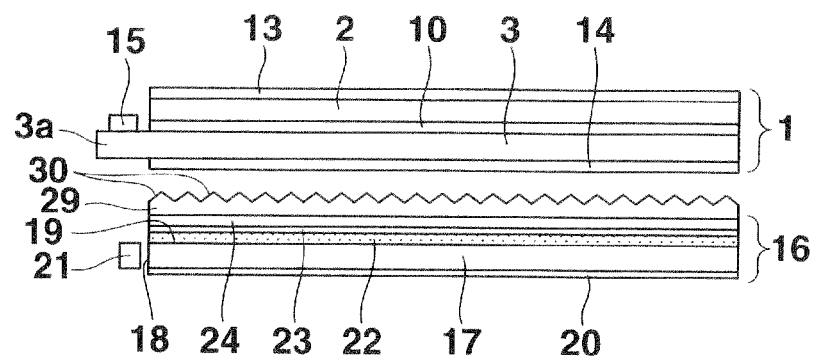
FIG. 10 is a side view showing the liquid crystal display apparatus according to the fourth embodiment.
Figure 11:
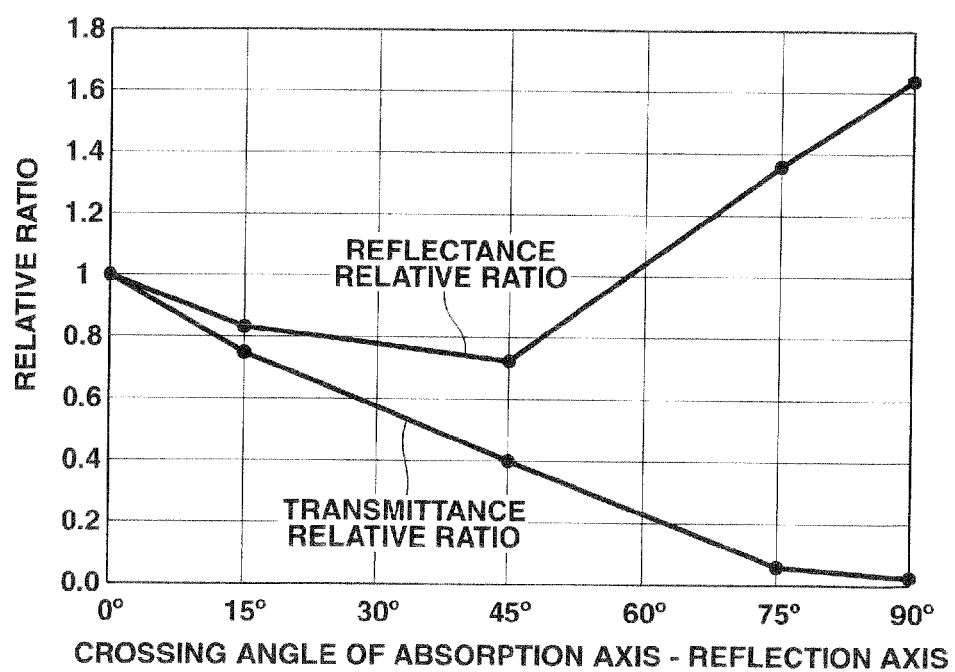
FIG. 11 is a view showing changes in a reflectance relative ratio and a transmittance relative ratio associated with a crossing angle of a reflection axis of a reflective polarizing film with prisms with respect to an absorption axis of a rear polarizing plate of the liquid crystal display device in the liquid crystal display apparatus according to the fourth embodiment.

FIGS. 9 to 11 show a fourth embodiment according to the present invention, and FIG. 9 is an exploded perspective view of a liquid crystal display apparatus whilst FIG. 10 is a side view of the liquid crystal display apparatus. It is to be noted that like reference numerals denote parts corresponding to those in the first embodiment, thereby omitting a description thereof.

In a liquid crystal display apparatus according to this embodiment, a reflective polarizing film with prisms 29 is provided as an optical member substituting for the reflective polarizing film 25 in the first embodiment between a liquid crystal display device 1 and a surface light source 16, and the diffusion layer 26 in the first embodiment is not provided. The reflective polarizing film with the prisms 29 has a reflection axis 29a and a transmission axis 29b in directions perpendicular to each other, and has a plurality of elongated small prisms 30 aligned in parallel on its surface facing the liquid crystal display device 1 along a direction substantially perpendicular to the reflection axis 29a.

It is to be noted that the reflective polarizing film with prisms 29 is obtained by integrally forming a reflective polarizing film having the reflection axis 29a and the transmission axis 29b in the directions perpendicular to each other and a prism sheet on which the plurality of small prisms 30 are arranged in parallel. The reflective polarizing film with prisms 29 is arranged in such a manner that a flat surface thereof on an opposite side of a surface on which the small prisms 30 are formed is in close proximity to or in contact with apexes of a plurality of small prisms 24 of one prism array 23 arranged on an exit side of a surface light source 16.

In this liquid crystal display apparatus, the reflective polarizing film with prisms 29 is arranged in such a manner that its reflection axis 29a faces a direction that crosses an absorption axis 14a of a rear polarizing plate 14 of the liquid crystal display device 1 at an angle larger than 0° and equal to or below 90°.

It is desirable to set a crossing angle α of the reflection axis 29a of the reflective polarizing film with prisms 29 with respect to the absorption axis 14a of the rear polarizing plate 14 of the liquid crystal display device 1 to an angle falling within the range of 45° to 90°, or more preferable to set the same to an angle falling within the range of 55° to 65°.

In this embodiment, as shown in FIG. 9, the reflective polarizing film with prisms 29 is arranged in such a manner that its reflection axis 29a faces an angular direction of 10° counterclockwise with respect to a lateral axis x of a screen as seen from the observation side, and the crossing angle α of the reflection axis 29a of the reflective polarizing film with prisms 29 with respect to the absorption axis 14a of the rear polarizing plate 14 of the liquid crystal display device 1 to 55°.

Moreover, in this embodiment, the prism array 23 in the surface light source 16 that is adjacent to the reflective polarizing film with prisms 29 is arranged in such a manner that a longitudinal direction of the plurality of small prisms 24 on this prism array 23 is substantially perpendicular to a longitudinal direction of the small prisms 30 on the reflective polarizing film with prisms 29.

In this liquid crystal display apparatus, the reflective polarizing film with prisms 29 having the plurality of small prisms 30 arranged in parallel on the surface facing the liquid crystal display device 1 is arranged between the liquid crystal display device and the surface light source 16. Therefore, light that has entered from the observation side and has been reflected by the reflective polarizing film with prisms 29 and the surface light source 16 at the time of reflective display and light that has been applied from the surface light source 16 and transmitted through the reflective polarizing film with prisms 29 at the time of transmissive display can be diffused in a direction perpendicular to the longitudinal direction of the plurality of small prisms 30 of the reflective polarizing film with prisms 29 to enter the liquid crystal display device 1 from the rear side thereof by these small prisms 30. Therefore, in both the reflective display and the transmissive display, the liquid crystal display device 1 can display an image having a wide viewing angle without brightness unevenness.

Further, the reflective polarizing film with prisms 29 has the plurality of elongated small prisms 30 arranged in parallel along the direction substantially perpendicular to the reflection axis 29a. Therefore, light reflected by the reflective polarizing film 29 at the time of reflective display (a linearly polarized light component parallel to the reflection axis 29a) can be more effectively diffused, and the recycle effect can be improved.

Further, in this embodiment, the longitudinal direction of the small prisms 24 of the prism array 23 in the surface light source 16 is substantially perpendicular to the longitudinal direction of the small prisms 30 of the reflective polarizing film with prisms 29. Therefore, light transmitted through the reflective polarizing film with prisms 29 in light reflected by the surface light source 16 and collected by the prism array 23 at the time of the reflective display and light collected and applied by the prism array 23 from the surface light source 16 at the time of transmissive display can be effectively diffused by the plurality of small prisms 30 on the reflective polarizing film with prisms 29.

FIG. 11 shows changes in a reflectance relative ratio and a transmittance relative ratio associated with the crossing angle α of the reflection axis 29a of the reflective polarizing film with prisms 29 with respect to the absorption axis 14a of the rear polarizing plate 14 of the liquid crystal display device 1 in the liquid crystal display apparatus.

As shown in FIG. 11, in the liquid crystal display apparatus, the transmittance relative ratio is reduced as the crossing angle α becomes larger in the range of 0° to 90°. On the other hand, the reflectance relative ratio becomes larger than the transmittance relative ratio when the crossing angle α falls in the range of 0° to 90°. An increase rate of the reflectance relative ratio rises with an increase in the crossing angle α in the range of 45° to 90° in particular.

In regard to the transmittance relative ratio and the reflectance relative ratio at each crossing angle α in the range larger than 0° and equal to or below 90°, the reflectance relative ratio becomes larger than the transmittance relative ratio at all crossing angles α in the range larger than 0° and equal to or below 90°. A difference between these ratios increases as the crossing angle α becomes larger. The difference between the reflectance relative ratio and the transmittance relative ratio further increases when the crossing angle α becomes 45° or above. When the crossing angle α is changed in this manner, the reflectance relative ratio can be varied. If the reflectance relative ratio is larger than 1, visibility when external light illuminance is high can be improved.

Therefore, in the liquid crystal display apparatus, when the crossing angle α is set to the range larger than 0° and equal to or below 90°, the reflectance relative ratio can be increased to be higher than the transmittance relative ratio, and the brighter reflective display can be provided. In particular, it is more preferable to set the crossing angle α to an angle to fall within the range of 67° to 90° is preferable. When such a setting is adopted, the reflectance relative ratio can be increased, thereby providing the reflective display that is bright to the eyes.

In this liquid crystal display apparatus, it is preferable to set the crossing angle α to an angle in the range of 55° to 65°. Adopting such a setting enables increasing the reflectance relative ratio to be higher than 1.0, providing the brighter reflective display, assuring the transmittance relative ratio of 0.3 to 0.2, and effecting the sufficiently bright transmissive display.

Fifth Embodiment

Figure 12:
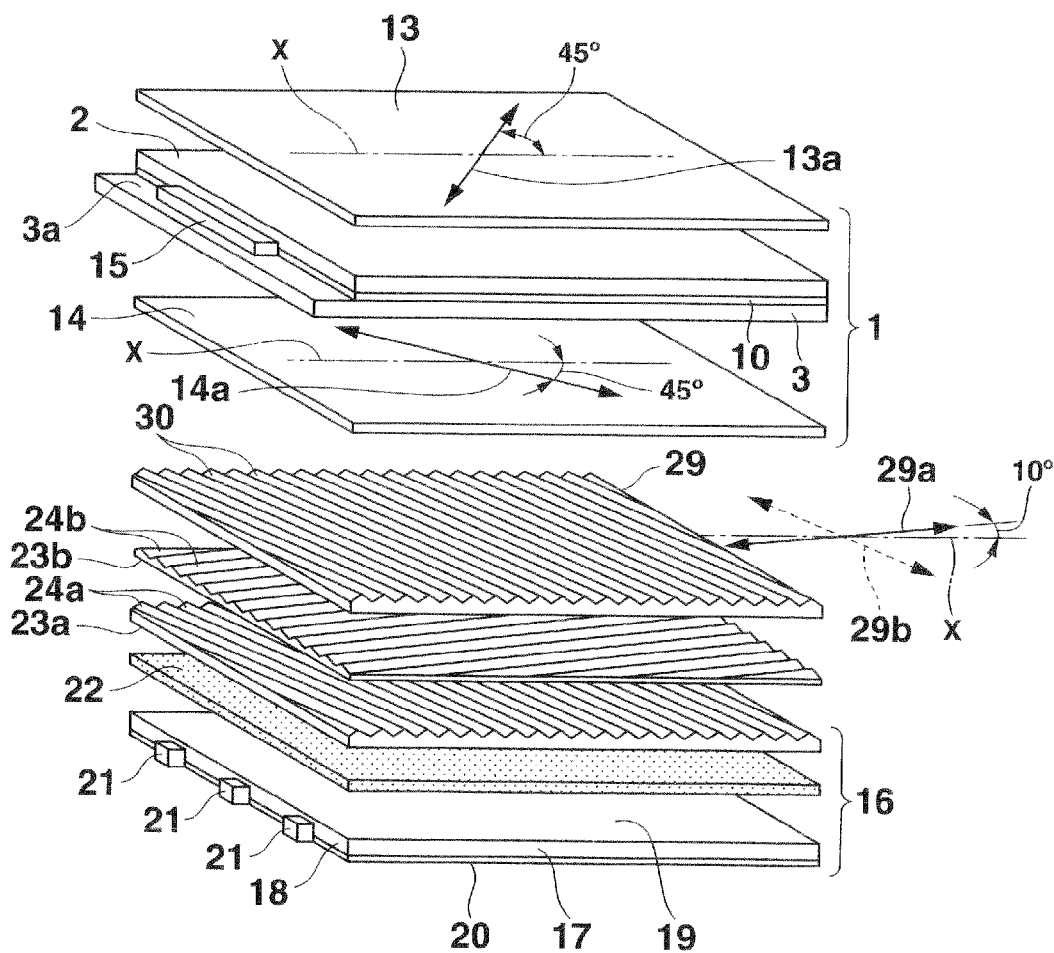
FIG. 12 is an exploded perspective view of a liquid crystal display apparatus showing a fifth embodiment according to the present invention.

FIG. 12 is an exploded perspective view of a liquid crystal display apparatus showing a fifth embodiment according to the present invention. It is to be noted that, in this embodiment, like reference numerals denote parts corresponding to those in the fourth embodiment, thereby omitting a description thereof.

A liquid crystal display apparatus according to this embodiment has a configuration where first and second two prism arrays 23a and 23b are provided to be laminated on each other on an exit side (an exit face side of a light guide plate 17) of a surface light source 16 in place of the prism array 23 in the liquid crystal display apparatus according to the fourth embodiment, and other structures are the same as those in the fourth embodiment.

In this embodiment, each of the two prism arrays 23a and 23b of the surface light source 16 is formed of a transparent member that has a surface formed into a flat surface on a side facing the light guide plate 17, and is provided with a plurality of elongated small prisms 24a or 24b that are arranged in parallel to each other and aligned in a direction perpendicular to a longitudinal direction thereof on a surface on an opposite side, i.e., a surface on a side facing the liquid crystal display device 1, and configured to collect light exiting from an exit face 19 of the light guide plate 17 to be applied to the liquid crystal display device 1. Of these prism arrays 23a and 23b, the second prism array 23b that is adjacent to the reflective polarizing film with prisms 29 is arranged in such a manner that the longitudinal direction of the plurality of small prisms 24b on this prism array 23b is substantially perpendicular to a longitudinal direction of small prisms 30 of the reflective polarizing film with prisms 29, and the first prism array 23a on the light guide plate 17 side is arranged in such a manner that the longitudinal direction of the plurality of small prisms 24a is substantially perpendicular to the longitudinal direction of the small prisms 24b on the second prism array 23b.

The first prism array 23a on the light guide plate 17 side is attached to an upper side of a diffusion sheet 22 bonded to an upper side of the exit face 19 of the light guide plate 17, and the second prism array 23b is in contact with or in close proximity to an upper side of the first prism array 23a.

In the liquid crystal display apparatus according to this embodiment, the two prism arrays 23a and 23b are arranged on the exit side of the surface light source 16 side in such a manner that the longitudinal directions of their small prisms 24a and 24b are perpendicular to each other. Therefore, light that has entered from the observation side and has been reflected by the surface light source 16 and illumination light that has been applied from the surface light source 16 can be collected in the direction perpendicular to the longitudinal direction of the plurality of small prisms 24a of the first prism array 23a and the direction perpendicular to the longitudinal direction of the plurality of small prisms 24b of the second prism array 23b, so that light having a luminance distribution with high front luminance is applied to the liquid crystal display device 1, which allows brighter reflective display and transmissive display.

Sixth Embodiment

Figure 13:
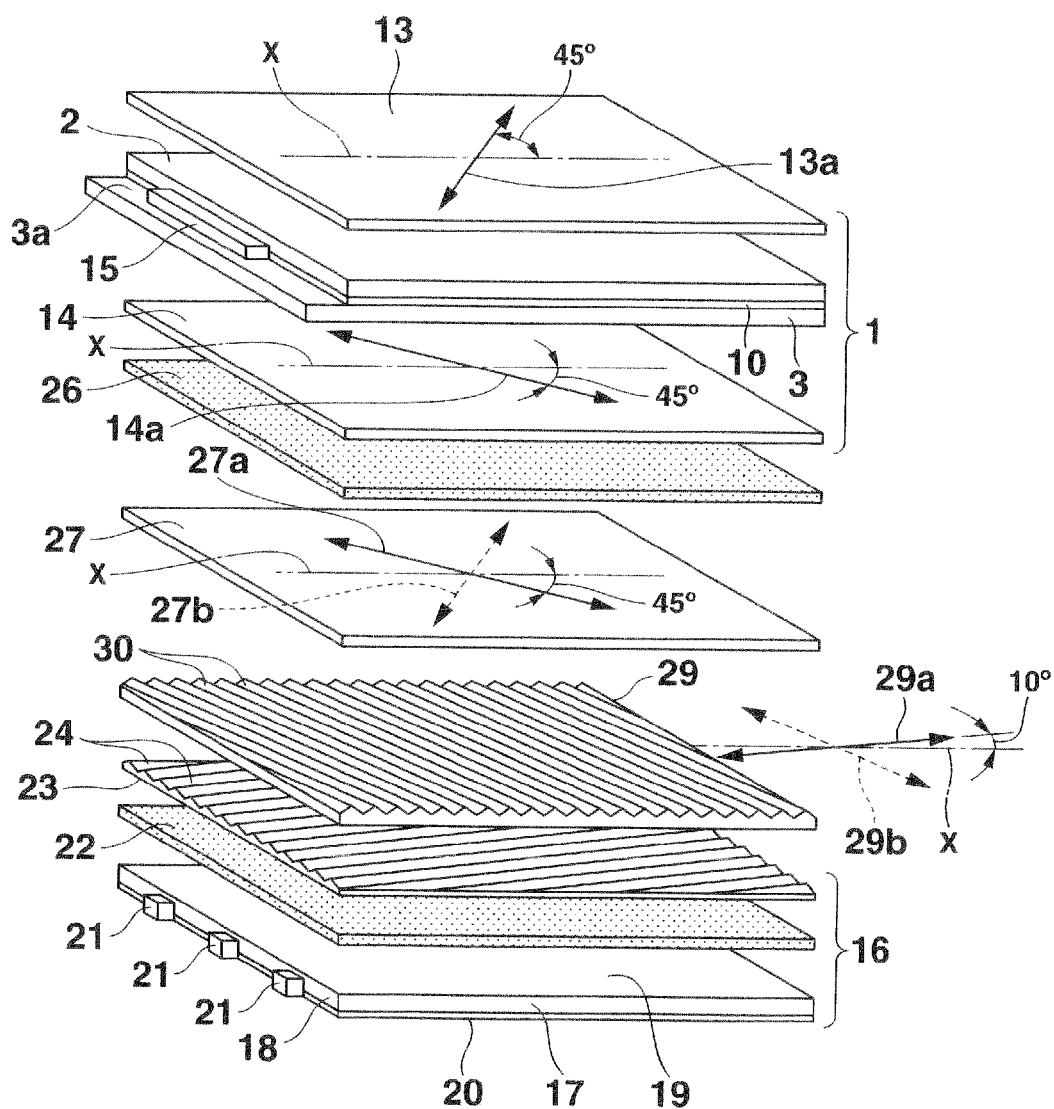
FIG. 13 is an exploded perspective view of a liquid crystal display apparatus showing a sixth embodiment according to the present invention.
Figure 14:
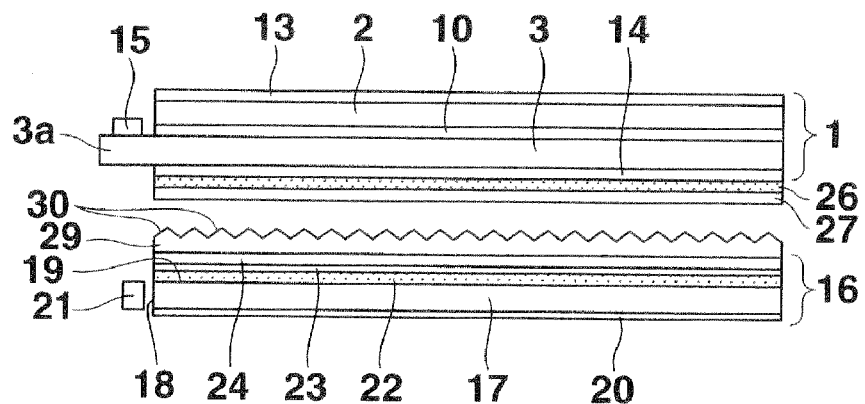
FIG. 14 is a side view of the liquid crystal display apparatus according to the sixth embodiment.
Figure 15:
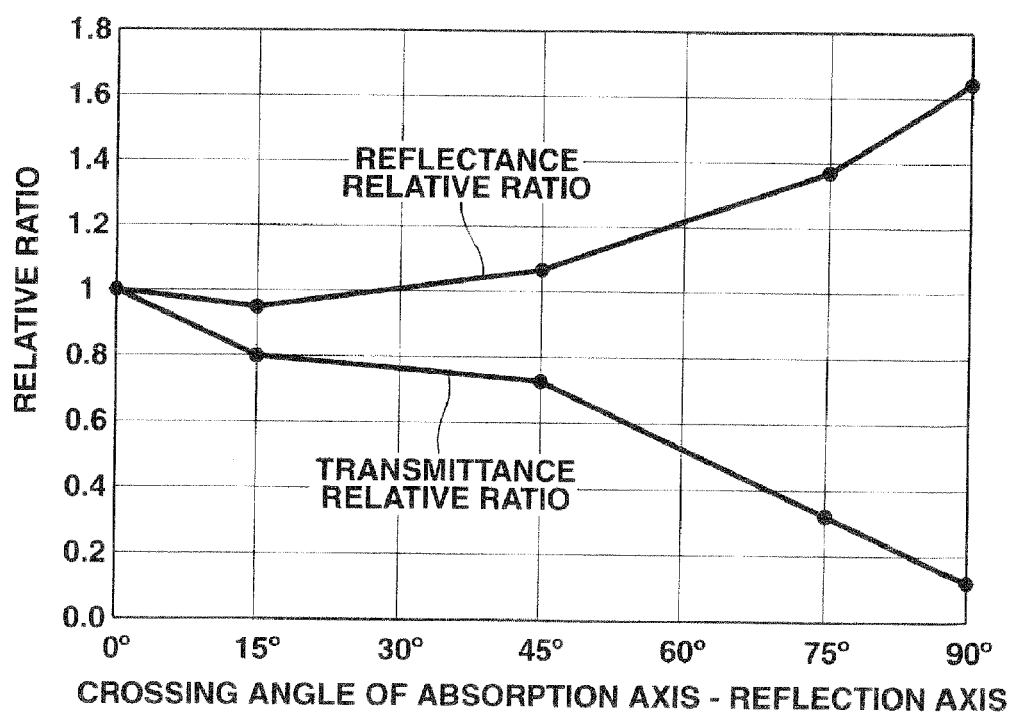
FIG. 15 is a view showing changes in a reflectance relative ratio and a transmittance relative ratio associated with a crossing angle of a reflection axis of a reflective polarizing film with prisms with respect to an absorption axis of a rear polarizing plate of the liquid crystal display device in the liquid crystal display apparatus according to the sixth embodiment.

FIGS. 13 to 15 show a sixth embodiment according an exploded perspective view of a liquid crystal display apparatus whilst FIG. 14 is a side view of the liquid crystal display apparatus. It is to be noted that, in this embodiment, like reference numerals denote parts corresponding to those according to the fourth embodiment, thereby omitting a description thereof.

A liquid crystal display apparatus according to this embodiment has a configuration that a reflective polarizing plate 27 is arranged between the liquid crystal display device 1 and the reflective polarizing film with prisms 29 in the liquid crystal display apparatus according to the fourth embodiment, and other structures are the same as those in the fourth embodiment. The reflective polarizing plate 27, which has a reflection axis 27a and a transmission axis 27b perpendicular to each other, is to reflect linearly polarized light having a plane of vibration of light parallel to the reflection axis 27a, and to transmit linearly polarized light having a plane of vibration of light parallel to the transmission axis 27b. The reflective polarizing plate 27 is arranged in such a manner that the reflection axis 27a is substantially parallel to an absorption axis 14a of a rear polarizing plate 14 of the liquid crystal display device 1.

The reflective polarizing plate 27 is the same as the reflective polarizing plate in the third embodiment, and this reflective polarizing plate 27 is attached to an outer surface of the rear polarizing plate 14 of the liquid crystal display device 1 by a diffusion layer 26 formed of a pressure sensitive adhesive in which scattering particles are dispersed like the third embodiment.

In this liquid crystal display apparatus, the reflective polarizing film with prisms 29 is arranged in such a manner that a reflection axis 29a thereof faces a direction that crosses the absorption axis 14a of the rear polarizing plate 14 of the liquid crystal display device 1 at an angle larger than 0° and equal to or below 90°.

It is preferable to set a crossing angle α of the reflection axis 25a of the reflective polarizing film with prisms 29 with respect to the absorption axis 14a of the rear polarizing plate 14 of the liquid crystal display device 1 to an angle falling within the range of 30° to 90°, more preferable to set the same to an angle falling within the range of 30° to 85°, and further preferable to set the same to an angle falling within the range of 45° to 85°.

In this embodiment, as shown in FIG. 13, the reflective polarizing film with prisms 29 is arranged in such a manner that its reflection axis 29a faces an angular direction of 10° counterclockwise with respect to a lateral axis x of a screen as seen from the observation side, and the crossing angle of the reflection axis 25a of the reflective polarizing film with prisms 29 with respect to the absorption axis 14a of the rear polarizing plate 14 of the liquid crystal display device 1 is set to 55°.

In this liquid crystal display apparatus, the reflective polarizing plate 27 is arranged between the liquid crystal display device 1 and the reflective polarizing plate 29 with prisms in such a manner that the reflection axis 27a is substantially parallel to the absorption axis 14a of the rear polarizing plate 14 of the liquid crystal display device 1. Therefore, the reflectance relative ratio can be set to be larger than the transmittance relative ratio when the crossing angle α of the reflection axis 29a of the reflective polarizing film 29 with prism with respect to the absorption axis 14a of the rear polarizing plate 14 in the liquid crystal display device 1 is larger than 0° and equal to or below 90°.

This liquid crystal display apparatus carries out the same reflective display and transmissive display as those in the liquid crystal display apparatus according to the third embodiment. At the time of the reflective display, light that has entered from the observation side and has been transmitted through the liquid crystal display device 1 and the reflective polarizing plate 27 is reflected by the reflective polarizing film with prisms 29 and the surface light source 16, this reflected light is diffused by a plurality of small prisms 30 of the reflective polarizing film with prisms 29, and the diffused light is efficiently transmitted through the reflective polarizing plate 27 and the liquid crystal display device 1 to exit to the observation side by a recycle effect based on repeating the reflection between the reflective polarizing film with prisms 29 and the reflective polarizing plate 27.

Furthermore, at the time of the reflective display, light that has been applied from the surface light source 16 and transmitted through the reflective polarizing film with prisms 29 is diffused by the plurality of small prisms 30 of the reflective polarizing film with prisms 29, and this light is efficiently transmitted through the reflective polarizing plate 27 and the liquid crystal display device 1 to exit to the observation side by the recycle effect.

FIG. 15 shows changes in a reflectance relative ratio and a transmittance relative ratio associated with the crossing angle α of the reflection axis 29a of the reflective polarizing film with prisms 29 with respect to the absorption axis 14a of the rear polarizing plate 14 of the liquid crystal display device 1 in the liquid crystal display apparatus.

As shown in FIG. 11, in the liquid crystal display apparatus, the transmittance relative ratio is reduced as the crossing angle α increases when, the crossing angle α falls within the range of 0° to 90°. On the other hand, the reflectance relative ratio rises as the crossing angle α increases when the crossing angle α falls in the range of 15° to 90°. In particular, an increase rate of the reflectance relative ratio with respect to a change in the crossing angle α increases in the range of 45° to 90°.

Moreover, in regard to the transmittance relative ratio and the reflectance relative ratio for each crossing angle α when the crossing angle α is larger than 0° and equal to or below 90°, the reflectance relative ratio becomes larger than the transmittance relative ratio, and a difference between these ratios increases as the crossing angle α becomes large. In particular, when the crossing angle α becomes 45° or above, the difference between the reflectance relative ratio and the transmittance relative ratio further increases.

Therefore, in the liquid crystal display apparatus, the reflectance relative ratio can be increased to be larger than the transmittance relative ratio and the brighter reflective display can be provided by setting the crossing angle α to be larger than 0° and equal to or below 90°. When the crossing angle α is changed in this manner, the reflectance relative ratio can be changed. When the reflectance relative ratio is larger than 1, visibility when external light illuminance is high can be improved.

In this liquid crystal display apparatus, it is preferable to set the crossing angle α to an angle falling within the range of 30° to 90°. Adopting such a setting enables increasing the reflectance relative ratio to be larger than 1.0, thereby providing the brighter reflective display. In particular, it is more preferable to set the crossing angle α to an angle falling within the range of 57° to 90° is preferable. When such a setting is adopted, the reflectance relative ratio is increased, so that the reflective display bright to the eyes can be provided.

It is preferable to set the crossing angle α to an angle falling within the range of 30° to 85°, and adopting such a setting enables assuring the transmittance relative ratio of 0.75 to 0.2 and effecting the sufficiently bright transmissive display.

It is preferable to set the crossing angle α to an angle falling within the range of 45° to 85°, and adopting such a setting enables increasing the reflectance relative ratio to be sufficiently larger than the transmittance relative ratio.

Although the surface light source 16 includes the single prism array 23 in the sixth embodiment, the surface light source 16 may include two prism arrays 23a and 23b like the fifth embodiment.

Additional advantages and modifications will readily occur to those skilled in the art. Therefore, the invention in its broader aspects is not limited to the specific details and representative embodiments shown and described herein. Accordingly, various modifications may be made without departing from the spirit, or scope of the general inventive concept as defined by the appended claims and their equivalents.

What is claimed is:

1. A liquid crystal display apparatus comprising:
    a liquid crystal display device including a pair of substrates that are arranged so as to face each other through a gap with a plurality of electrodes formed on at least one of surfaces facing each other, a liquid crystal layer sealed into the gap between the substrates, and a pair of polarizing plates arranged so as to sandwich the pair of substrates therebetween;
    a surface light source to irradiate illumination light toward the liquid crystal display device; and
    an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis, the optical member being arranged between the liquid crystal display device and the surface light source in such a manner that the reflection axis of the optical member faces a direction that crosses an absorption axis of one of the pair of polarizing plates arranged between the liquid crystal display device and the surface light source at an angle falling within the range of 15° to 90°;
    wherein the surface light source includes:
    a light guide plate that is formed of a transparent tabular member, has an entrance end face that is composed of an end face of the tabular member and through which light enters and an exit face that is composed of one of two plate faces of the tabular member and through which light that has entered exits, and is arranged so that the exit face faces the liquid crystal display device;
    a reflection film, provided on an opposite side of the exit face of the light guide plate, to reflect light that has entered the light guide plate through the entrance end face and light that has entered the light guide plate through the exit face toward the exit face;
    a light-emitting device arranged so as to face the entrance end face of the light guide plate; and
    at least one prism array arranged on an exit face side of the light guide plate and provided with a plurality of elongated small prisms arranged in parallel to each other and configured to collect light that has exited the light guide plate through the exit face to apply the collected light to the liquid crystal display device; and
    wherein the optical member is formed of a reflective polarizing film with prisms that is provided with a plurality of elongated small prisms that are arranged in parallel to each other and aligned in a direction perpendicular to the reflection axis on a surface facing the liquid crystal display device, and a prism array that is included in the at least one prism array and adjacent to the reflective polarizing film with prisms is arranged in such a manner that a longitudinal direction of a plurality of small prisms of the prism array adjacent to the reflective polarizing film with prisms is perpendicular to a longitudinal direction of the small prisms of the reflective polarizing film with prisms.

2. The apparatus according to claim 1, wherein the reflective polarizing film is arranged in such a manner that the reflection axis of the reflection polarizing film faces a direction that crosses the absorption axis of the one polarizing plate at an angle falling within the range of 45° to 90°.

3. The apparatus according to claim 2, wherein a crossing angle of the reflection axis of the reflective polarizing film with respect to the absorption axis of the one polarizing plate is set to an angle falling within the range of 55° to 65°.

4. A liquid crystal display apparatus comprising:
    a liquid crystal display device including a pair of substrates that are arranged so as to face each other through a gap with a plurality of electrodes formed on at least one of surfaces facing each other, a liquid crystal layer sealed into the gap between the substrates, and a pair of polarizing plates arranged so as to sandwich the pair of substrates therebetween;
    a surface light source to irradiate illumination light toward the liquid crystal display device;
    an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis, the optical member being arranged between the liquid crystal display device and the surface light source in such a manner that the reflection axis of the optical member faces a direction that crosses an absorption axis of one of the pair of polarizing plates arranged between the liquid crystal display device and the surface light source at a predetermined angle, the optical member being formed of a reflective polarizing film, the reflective polarizing film being arranged in such a manner that the reflection axis of the reflective polarizing film faces a direction that crosses the absorption axis of the one polarizing plate at an angle of 90° or below; and
    a reflective polarizing plate, arranged between the liquid crystal display device and the reflective polarizing film and having a transmission axis and a reflection axis perpendicular to each other, to reflect linearly polarized light having a plane of vibration of light parallel to the reflection axis, and to transmit linearly polarized light having a plane of vibration of light parallel to the transmission axis, the reflective polarizing plate being arranged in such a manner that the reflection axis of the reflective polarizing plate is parallel to the absorption axis of the one polarizing plate
    wherein a diffusion layer having a haze value of 10 to 90% is further arranged between the reflective polarizing film and the reflective polarizing plate.

5. The apparatus according to claim 4, wherein a crossing angle of the reflection axis of the reflective polarizing film with respect to the absorption axis of the one polarizing plate is set to an angle falling within the range of 20° to 85°.

6. The apparatus according to claim 4, wherein the surface light source includes:
   a light guide plate that is formed of a transparent tabular member, has an entrance end face that is composed of an end face of the tabular member and through which light enters and an exit face that is composed of one of two plate face of the tabular member and through which light that has entered exits, and is arranged so that the exit face faces the liquid crystal display device;
   a reflection film, provided on an opposite side of the exit face of the light guide plate, to reflect light that has entered the light guide plate through the entrance end face and light that has entered the light guide plate through the exit face toward the exit face;
   a light-emitting device arranged so as to face the entrance end face of the light guide plate; and
   at least one prism array arranged on an exit face side of the light guide plate and provided with a plurality of elongated small prisms arranged in parallel to each other and configured to collect light that has exited the light guide plate through the exit face to apply the collected light to the liquid crystal display device.

7. The apparatus according to claim 6, wherein the optical member is formed of a reflective polarizing film with prisms that is provided with a plurality of elongated small prisms that are arranged in parallel to each other and aligned in a direction perpendicular to the reflection axis on a surface facing the liquid crystal display device, and a prism array that is included in the at least one prism array and adjacent to the reflective polarizing film with prisms is arranged in such a manner that a longitudinal, direction of a plurality of small prisms of the prism array adjacent to the reflective polarizing film with prisms is perpendicular to a longitudinal direction of the small prisms of the reflective polarizing film with prisms.

8. A liquid crystal display apparatus comprising:
   a liquid crystal display device including a pair of substrates that are arranged so as to face each other through a gap with a plurality of electrodes formed on at least one of surfaces facing each other, a liquid crystal layer sealed into the gap between the substrates, and a pair of polarizing plates arranged so as to sandwich the pair of substrates therebetween;
   a surface light source to irradiate illumination light toward the liquid crystal display device; and
   an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis, the optical member being arranged between the liquid crystal display device and the surface light source in such a manner that the reflection axis of the optical member faces a direction that crosses an absorption axis of one of the pair of polarizing plates arranged between the liquid crystal display device and the surface light source at a predetermined angle, the optical member being formed of a reflective polarizing film with prisms that is provided with a plurality of elongated small prisms that are arranged in parallel to each other and aligned in a direction perpendicular to the reflection axis on a surface facing the liquid crystal display device, the reflective polarizing film with prisms being arranged in such a manner that the reflection axis of the reflective polarizing film with prisms faces a direction that crosses the absorption axis of the one polarizing plate at an angle of 90° or below.

9. The apparatus according to claim 8, wherein a crossing angle of the reflection axis of the reflective polarizing film with prisms with respect to the absorption axis of the one polarizing plate is set to an angle falling within the range of 55° to 65°.

10. The apparatus according to claim 8, further comprising a reflective polarizing plate, arranged between the liquid crystal display device and the reflective polarizing film with prisms and having a reflection axis and a transmission axis perpendicular to each other, to reflect linearly polarized light having a plane of vibration of light parallel to the reflection axis, and to transmit linearly polarized light having a plane of vibration of light parallel to the transmission axis, and the reflective polarizing plate being arranged in such a manner that the reflection axis of the reflective polarizing plate is parallel to the absorption axis of the one polarizing plate, and the reflective polarizing film with prisms is arranged in such a manner that the reflection axis of the reflective polarizing film with prisms faces a direction that crosses the absorption axis of the one polarizing plate at an angle of 90° or below.

11. The apparatus according to claim 10, wherein a crossing angle of the reflection axis of the reflective polarizing film with prisms with respect to the absorption axis of the one polarizing plate is set to an angle falling within the range of 30° to 85°.

12. The apparatus according to claim 10, wherein the surface light source includes:
   a light guide plate that is formed of a transparent tabular member, has an entrance end face that is composed of an end face of the tabular member and through which light enters and an exit face that is composed of one of two plate face of the tabular member and through which light that has entered exits, and is arranged so that the exit face faces the liquid crystal display device;
   a reflection film, provided on an opposite side of the exit face of the light guide plate, to reflect light that has entered the light guide plate through the entrance end face and light that has entered the light guide plate through the exit face toward the exit face;
   a light-emitting device arranged so as to face the entrance end face of the light guide plate; and
   at least one prism array arranged on an exit face side of the light guide plate and provided with a plurality of elongated small prisms arranged in parallel to each other and configured to collect light that has exited the light guide plate through the exit face to apply the collected light to the liquid crystal display device.

13. The apparatus according to claim 12, wherein the optical member is formed of a reflective polarizing film with prisms that is provided with a plurality of elongated small prisms that are arranged in parallel to each other and aligned in a direction perpendicular to the reflection axis on a surface facing the liquid crystal display device, and a prism array that is included in the at least one prism array and adjacent to the reflective polarizing film with prisms is arranged in such a manner that a longitudinal direction of a plurality of small prisms of the prism array adjacent to the reflective polarizing film with prisms is perpendicular to a longitudinal direction of the small prisms of the reflective polarizing film with prisms.

14. A liquid crystal display apparatus comprising:
   a liquid crystal display device including a pair of substrates that are arranged so as to face each other through a gap with a plurality of electrodes formed on at least one of surfaces facing each other, a liquid crystal layer sealed into the gap between the substrates, and a pair of polarizing plates arranged so as to sandwich the pair of substrates therebetween;

a surface light source to irradiate illumination light toward the liquid crystal display device; and an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis, the optical member being arranged between the liquid crystal display device and the surface light source in such a manner that the reflection axis of the optical member faces a direction that crosses an absorption axis of one of the pair of polarizing plates arranged between the liquid crystal display device and the surface light source at an angle falling within the range of 15° to 90°.

15. A liquid crystal display apparatus comprising:

a liquid crystal display device including a pair of substrates that are arranged so as to face each other through a gap with a plurality of electrodes formed on at least one of surfaces facing each other, a liquid crystal layer sealed into the gap between the substrates, and a pair of polarizing plates arranged so as to sandwich the pair of substrates therebetween;

a surface light source to irradiate illumination light toward the liquid crystal display device;

an optical member, having a transmission axis and a reflection axis perpendicular to each other, to reflect linearly polarized light having a plane of vibration of light parallel to the reflection axis, and to transmit linearly polarized light having a plane of vibration of light parallel to the transmission axis, the optical member being arranged between the liquid crystal display device and the surface light source in such a manner that the reflection axis of the optical member faces a direction that crosses an absorption axis of one of the pair of polarizing plates arranged between the liquid crystal display device and the surface light source at a predetermined angle, the optical member being formed of a reflective polarizing film, the reflective polarizing film being arranged in such a manner that the reflection axis of the reflective polarizing film faces a direction that crosses the absorption axis of the one polarizing plate at an angle of 90° or below; and a reflective polarizing plate, arranged between the liquid crystal display device and the reflective polarizing film and having a transmission axis and a reflection axis perpendicular to each other, to reflect linearly polarized light having a plane of vibration of light parallel to the reflection axis, and to transmit linearly polarized light having a plane of vibration of light parallel to the transmission axis, the reflective polarizing plate being arranged in such a manner that the reflection axis of the reflective polarizing plate is parallel to the absorption axis of the one polarizing plate.

* * * * *